(12) United States Patent
Webber

(10) Patent No.: US 11,873,469 B2
(45) Date of Patent: Jan. 16, 2024

(54) FERMENTATION TEMPERATURE MANAGEMENT

(71) Applicant: Steven Dee Wayne Webber, Granite Bay, CA (US)

(72) Inventor: Steven Dee Wayne Webber, Granite Bay, CA (US)

( * ) Notice: Subject to any disclaimer, the term of this patent is extended or adjusted under 35 U.S.C. 154(b) by 1043 days.

(21) Appl. No.: 16/516,212

(22) Filed: Jul. 18, 2019

(65) Prior Publication Data

US 2019/0338225 A1  Nov. 7, 2019

Related U.S. Application Data

(63) Continuation of application No. 13/919,815, filed on Jun. 17, 2013, now Pat. No. 10,385,298.

(60) Provisional application No. 61/803,435, filed on Mar. 19, 2013, provisional application No. 61/663,027, filed on Jun. 22, 2012.

(51) Int. Cl.
| | |
|---|---|
| *C12C 11/00* | (2006.01) |
| *C12G 1/036* | (2006.01) |
| *F28F 1/00* | (2006.01) |
| *B23P 15/26* | (2006.01) |
| *C12C 13/10* | (2006.01) |
| *F28D 1/06* | (2006.01) |
| *F28F 3/12* | (2006.01) |
| *F28F 21/06* | (2006.01) |

(52) U.S. Cl.
CPC .............. *C12C 11/00* (2013.01); *B23P 15/26* (2013.01); *C12C 13/10* (2013.01); *C12G 1/0206* (2013.01); *F28D 1/06* (2013.01); *F28F 1/00* (2013.01); *F28F 3/12* (2013.01); *F28F 21/062* (2013.01); *F28F 21/065* (2013.01); *Y10T 29/4935* (2015.01)

(58) Field of Classification Search
CPC . C12C 11/00; C12C 13/10; F28D 1/06; B23P 15/26; C12G 1/0206; F28F 1/00; F28F 3/12; F28F 21/062; F28F 21/065; Y10T 29/4935; F25D 31/006; F25D 31/007
USPC .......................................................... 99/276
See application file for complete search history.

(56) References Cited

U.S. PATENT DOCUMENTS 2,356,779 A * 8/1944 Morrison .............. F25D 31/006
                                                           62/471
2,742,048 A * 4/1956 Kromer ................. B67D 1/1466
                                                           137/212

(Continued)

FOREIGN PATENT DOCUMENTS

GB          2236842 A  *  4/1991  .......... F25D 31/006

*Primary Examiner* — Tho V Duong
*Assistant Examiner* — Raheena R Malik
(74) *Attorney, Agent, or Firm* — Hamilton Patent Services LLC; Howard S. Hamilton

(57) ABSTRACT

A portable assembly for cooling the contents of a fermentation vessel is provided. In one embodiment, the assembly comprises an insulated, cylindrical enclosure having a fixed bottom and a removable lid. A flexible heat exchanger is cylindrically disposed within the enclosure and encircles the fermentation vessel. In one embodiment, the flexible heat exchanger is connected to a vessel containing thermally conductive fluid by flexible tubes that extend outside the enclosure. In one embodiment, a heating element is used to heat the fermentation vessel.

21 Claims, 17 Drawing Sheets

(56) References Cited

U.S. PATENT DOCUMENTS

| | | | | |
|---|---|---|---|---|
| 4,148,355 A * | 4/1979 | Gehring | F24H 4/04 | 165/104.19 |
| 4,206,805 A * | 6/1980 | Beckett | F04B 39/06 | 165/169 |
| 4,523,594 A * | 6/1985 | Kuznetz | F28F 21/062 | 607/104 |
| 4,562,890 A * | 1/1986 | Matoba | B60S 1/487 | 165/169 |
| 4,652,451 A * | 3/1987 | Leedham | C12P 7/06 | 426/11 |
| 4,691,762 A * | 9/1987 | Elkins | A41D 13/0053 | 607/108 |
| 4,814,189 A * | 3/1989 | Laude-Bousquet | C12G 1/0213 | 426/15 |
| 5,027,971 A * | 7/1991 | Perryman | B01J 19/0013 | 29/455.1 |
| 5,173,318 A * | 12/1992 | Leu | C12H 1/16 | 426/316 |
| 5,249,623 A * | 10/1993 | Muller | F23K 5/20 | 165/169 |
| 5,662,695 A * | 9/1997 | Mason | A61M 5/1415 | 607/104 |
| 5,871,526 A * | 2/1999 | Gibbs | A61F 7/02 | 607/104 |
| 5,974,824 A * | 11/1999 | Galockin | F28D 1/06 | 62/394 |
| 6,035,903 A * | 3/2000 | Few | F01M 11/0458 | 141/98 |
| 6,477,855 B1 * | 11/2002 | Findley | C02F 1/686 | 62/118 |
| 6,851,579 B2 * | 2/2005 | Savage | B65D 75/5877 | 220/62.12 |
| 7,661,460 B1 * | 2/2010 | Cowans | F28D 7/024 | 165/163 |
| 7,756,404 B2 * | 7/2010 | Schubert | F28D 7/026 | 392/484 |
| 7,870,891 B2 * | 1/2011 | Rule | F28D 20/0034 | 165/129 |
| 8,881,795 B2 * | 11/2014 | Rule | F28D 20/0034 | 165/129 |
| 2002/0144807 A1 * | 10/2002 | McCrorie, IV | F28D 1/06 | 165/169 |
| 2003/0229385 A1 * | 12/2003 | Elkins | A61F 7/0085 | 607/104 |
| 2004/0031392 A1 * | 2/2004 | Belkin | C12C 13/00 | 99/275 |
| 2005/0077029 A1 * | 4/2005 | Morales Cervantes | F28D 1/0213 | 165/90 |
| 2005/0256556 A1 * | 11/2005 | Schirrmacher | A61F 7/02 | 607/104 |
| 2006/0144569 A1 * | 7/2006 | Crocker | F28F 3/12 | 257/E23.098 |
| 2007/0266713 A1 * | 11/2007 | Matveev | C12H 1/16 | 62/3.64 |
| 2010/0129490 A1 * | 5/2010 | Williams | C12C 11/006 | 426/11 |
| 2010/0153312 A1 * | 6/2010 | Lemaire | G06Q 99/00 | 126/677 |
| 2010/0307622 A1 * | 12/2010 | Lee | F16L 11/24 | 156/274.2 |
| 2011/0098792 A1 * | 4/2011 | Lowe | A61F 7/0085 | 607/104 |
| 2011/0126564 A1 * | 6/2011 | Anandhakrishnan | F28D 5/00 | 62/304 |
| 2011/0186591 A1 * | 8/2011 | Pfister | F25D 31/007 | 221/97 |
| 2011/0303403 A1 * | 12/2011 | Holahan | H01L 23/4332 | 29/890.03 |
| 2012/0000631 A1 * | 1/2012 | Charamko | F25B 1/06 | 165/104.25 |
| 2013/0089925 A1 * | 4/2013 | Damren | F28F 9/0131 | 435/303.1 |

* cited by examiner

FERMENTATION TEMPERATURE MANAGEMENT

CROSS REFERENCE

The present application is related and claims priority to co-pending application Ser. No. 13/919,815, filed Jun. 17, 2013, which claims benefit of provisional application Ser. No. 61/663,027 filed Jun. 22, 2012 and provisional application Ser. No. 61/803,435 filed Mar. 20, 2013, each of which are incorporated herein by reference.

TECHNICAL FIELD

Embodiments relate generally to fermentation temperature management, and particularly to fermentation temperature control for the contents of small fermentation vessels.

BACKGROUND OF THE DISCLOSURE

In the small-scale production of beer and wine, there are wide ranges of process variables that can positively or negatively affect the outcome of the final product. Of these process variables, temperature is one of the most significant. While a particular batch of beer or wine may be of very high quality, without specific production controls, it may be difficult to consistently produce a high quality product. Fluctuations in fermentation temperature profiles, even while holding all other factors constant, can have a significant impact on the character and quality of the final product. Large seasonal differentials in ambient temperature can influence the fermentation process, and for some products, the daily fluctuation in ambient temperature can negatively impact the fermentation process.

In the production of beer, controlling temperature is critical during most phases of the process. From the production of the wort (a solution of fermentable and non-fermentable sugars) during the mash, though to the final fermentation of the beer, the temperature profile determines the character and quality of the final product. For example, during the mash, a brewer can extract different sugars from the malt and adjuncts based on the temperature and duration of the rests. If the brewer uses a lower temperature, the brewer can extract more fermentable sugars, increasing potential alcohol content and making a lighter style beverage. If the brewer uses a higher temperature, more non-fermentable sugars can be extracted, generating wort that is less fermentable, but with more of a characteristic referred to as "mouthfeel." During the mash, temperature selection and control is critical for extracting the desired fermentable and non-fermentable profile needed produce the end product.

During the beer fermentation stage, the desired temperature can depend on multiple characteristics. Different yeast strains require different temperatures, and different temperatures with a given yeast strain can significantly affect the character, quality, and consistency of the final product. For beer, the fermentation process is responsible for approximately 50% to 70% of the flavor profile. Lager yeasts perform better between approximately 7.22° C. (45° F.) to 12.78° C. (55° F.), while ale yeasts prefer temperatures around 15.56° C. (60° F.) to 21.11° C. (70° F.). If the temperature is too low, the yeast may become dormant. If the temperature is too high, the yeast may produce undesirable byproducts such as some esters, fusel alcohols, and too much diacetyl (e.g., butane-2,3-dione).

As with beer, the type of wine yeast determines the appropriate fermentation temperatures. Wine yeast strains can perform well with temperature ranges from the low 50s to the high 80s. For wine, cooler fermentation temperatures tend to preserve the nature of the fruit (such as aroma and a clean, crisp sensation); whereas warmer fermentation temperatures tend to produce more "complexity" and "mouthfeel", but the original nature of the fruit is diminished. If the fermentation temperature is too high, undesirable amounts of Hydrogen Sulfide ($H_2S$) are produced. Accordingly, it is critical to control fermentation temperatures to ensure the final product matches the intensions of the brewer/winemaker.

BRIEF DESCRIPTION OF THE DRAWINGS

The following description includes discussion of figures having illustrations given by way of exemplary implementations of the various embodiments. As used herein, references to one or more "embodiments" are to be understood as describing a particular feature, structure, or characteristic included in at least one implementation. Additionally, phrases such as "in one embodiment" or "in an alternate embodiment" appearing herein each describe various embodiments and implementations, and do not necessarily all refer to the same embodiment. Accordingly, the figures of the following drawings should be understood by way of example, and not by way of limitation, where like references indicate similar elements, and in which.

DETAILED DESCRIPTION

Figure 1A:
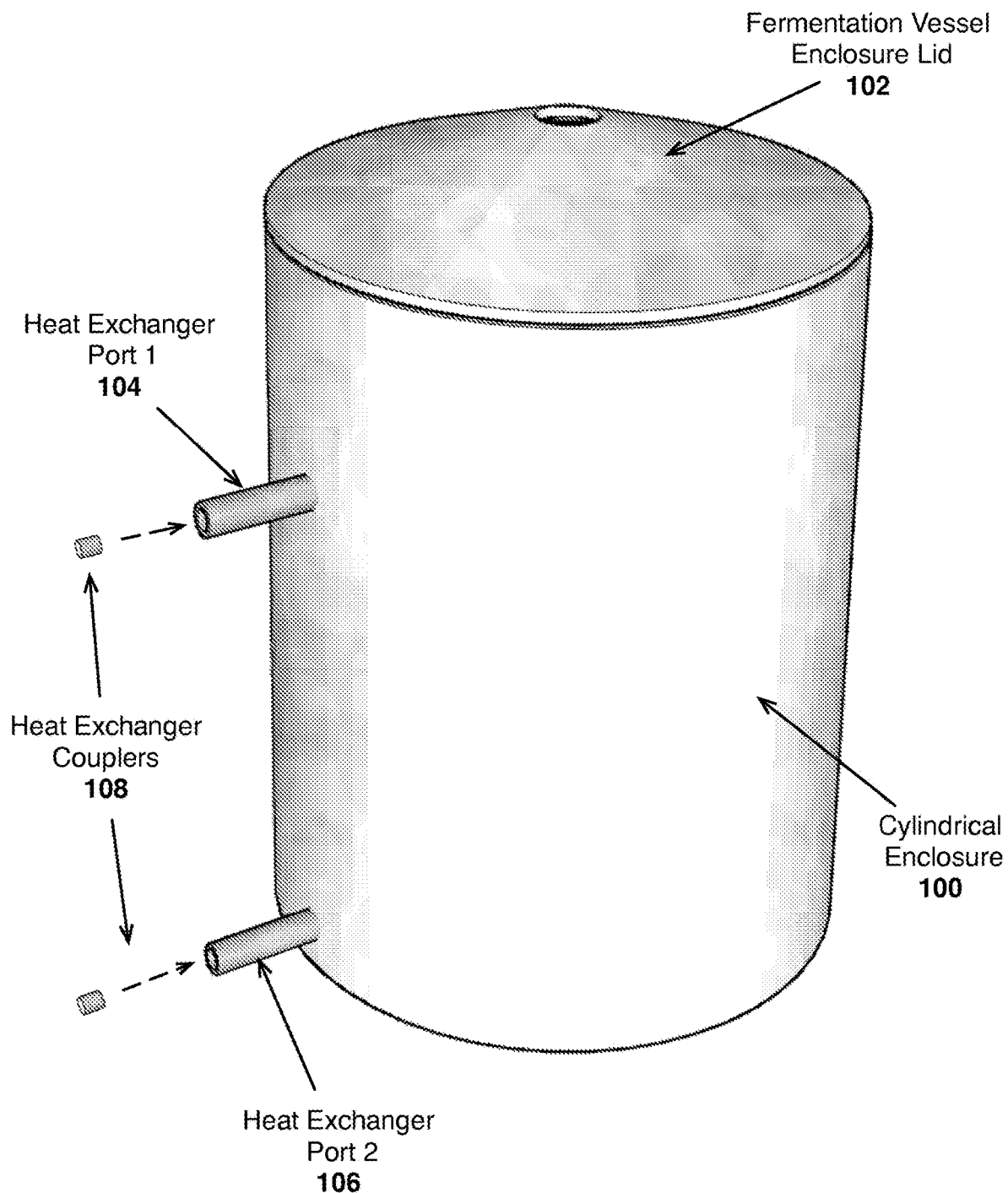
FIG. 1A and FIG. 1B are illustrations of a portable assembly including a fermentation vessel enclosure and a heat exchanger, to provide thermal management for beer and wine fermentation, according to an embodiment.

Various embodiments of a system and apparatus for temperature management in small scale brewing and fermentation operations are described. The various embodiments can be used to thermally manage (e.g., heat or cool) a human portable fermentation vessel to a temperature based on a pre-determined temperature profile, and maintain specific temperatures up to, or in excess of a 40° C. differential from ambient conditions. The ability to consistently control fermentation temperatures allows a beer brewer or wine maker to craft a particular product, and then repeatedly produce a consistent product by replicating the same temperature profile for subsequent batches, without requiring the use of expensive, high volume fermentation equipment.

In one embodiment, a portable assembly is provided that facilitates the thermal management of the contents of a 15-liter to 25-liter fermentation vessel during the process of beer and wine fermentation. The assembly includes an enclosure apparatus having a bottom, cylindrical wall, and lid, and encloses and insulates a small fermentation vessel having a volume between 15 liters and 25 liters. The surface of the cylindrical wall of the enclosure includes a waterproof polymer shell, where the lid of the enclosure is attached to the shell. The cylindrical wall of the enclosure includes a thermally insulating material attached to a waterproof internal surface of the cylindrical wall of the enclosure. In one embodiment, the insulating material is removably attached to the internal surface, and can be removed to, for example, clean the insulating material or the internal surface of the enclosure.

In one embodiment, a removable heat exchanger is cylindrically disposed inside of, and removable from within the enclosure apparatus. The heat exchanger is used to set and maintain a temperature of a fermenting liquid inside of the fermentation vessel, according to a programmed temperature profile. In one embodiment, the heat exchanger attaches to the fermentation vessel when the fermentation vessel is contained within the enclosure. A thermally conductive fluid flows through the heat exchanger, and is used to heat or cool the fermentation vessel depending on the temperature of the thermally conductive fluid relative to the temperature of the fermenting fluid in the fermentation vessel. The heat exchanger has inlet and outlet ports which each extend outside of the enclosure. In one embodiment, the inlet and outlet include flexible conduit. Separate inlet and outlet conduit can be used, and each includes a quick-disconnect coupler, to allow rapid attachment and detachment of the conduit from a fluid feed or fluid return.

Embodiments of elements of the assembly can be employed within a temperature control system for a fermentation vessel that suitable for beer and wine fermentation. The temperature control system comprises an embodiment of the flexible heat exchanger, to couple with the fermentation vessel, and to flow a thermally conductive fluid to heat or cool the fermentation vessel. The system also includes a temperature controller in electrical communication with a temperature sensor, such as a thermal probe, the temperature sensor coupled with the fermentation vessel, to sense a temperature of a fermenting liquid within the fermentation vessel. The temperature controller couples with a fluid pump having a drive motor and a fluid port, where the fluid port couples with the inlet or outlet of the flexible heat exchanger, and where the drive motor couples to the temperature controller. In one embodiment, the fluid pump is a magnetically driven pump, in which the drive motor is magnetically coupled with the pump impeller. Additionally, a fluid reservoir is coupled to the fluid pump and contains the thermally conductive fluid, which is pumped through the heat exchanger.

In one embodiment, the temperature controller energizes a circuit to power the fluid pump motor, to cause the thermally conductive fluid to flow from the fluid reservoir into the flexible heat exchanger. In one embodiment, the system features a two-stage programmable temperature controller, and a heating element is additionally coupled with the fermentation vessel and the two-stage temperature controller. The heating element can then be used to heat the fermenting liquid inside of the fermentation vessel, and the heat exchanger can be used to cool the fermentation vessel by flowing a cooled, thermally conductive fluid from the fluid reservoir in response to the temperature sensor indicating to the temperature controller than the fluid in the fermentative vessel has risen above a threshold temperature. Likewise, the temperature controller can energize a circuit to power the heating element responsive to an indication by the temperature sensor that the fermenting liquid is below a programmed threshold. Additionally, other features will be apparent from the accompanying drawings and their respective descriptions.

In one embodiment, the various components of the temperature control system are manually transportable to a selected location suitable for beer or wine fermentation in either an assembled or disassembled state, and the system can be readily deployed to accept one of multiple types of fermentation vessels. Deploying the enclosure can include inserting at least one insulating layer into the enclosure. An embodiment of the heat exchanger for the temperature control system can then be attached into an operational position that is suitable to allow the heat exchanger to be used to manager the temperature inside of the fermentation vessel. The operational position can include a location between the inner lining of the enclosure shell or the innermost layer of the enclosure insulation, or can include the outer surface of the fermenter, or fermentation vessel. In one embodiment, multiple heat exchangers can be coupled to encompass a fermenter of larger size than the standard 15-liter to 25-liter fermentation vessel used in small-scale fermentation. An embodiment of the heat exchanger can also include an insulating layer, to provide, or supplement the insulation attached to, or incorporated within the enclosure shell.

System setup also includes coupling a fluid feed line to a port of the heat exchanger and coupling a fluid return line to a second port of the heat exchanger. The fluid feed and fluid return can be a portable or stationary reservoir for a thermally conductive fluid (e.g., a water or glycol based fluid), which can be pumped through the heat exchanger at specific intervals to manage the internal temperature of the fermentation vessel. In one embodiment, the fluid reservoir can include a thermal well and a thermal sensor, such as a thermal probe, to monitor the temperature of the fluid reservoir. In one embodiment, the fluid in the fluid reservoir can be thermostatically maintained to heat or cool the fermentation vessel to the desired temperature.

System setup also includes coupling a temperature controller to a fluid pump, coupling the fluid pump with the heat exchanger, and coupling the temperature controller to a temperature sensor. The temperature sensor can be attached to the outside of the fermentation vessel, or the internal temperature can be sampled directly via a thermal probe inserted into a thermal well of the fermentation vessel, to sense the temperature inside of the fermentation vessel. To begin operation of the thermal management system during beer or wine fermentation, the fermentation vessel can be manually positioned within the enclosure shell, and the thermal controller is activated. The exemplary illustrations of the various embodiments shown in the figures are described below.

Figure 1B:
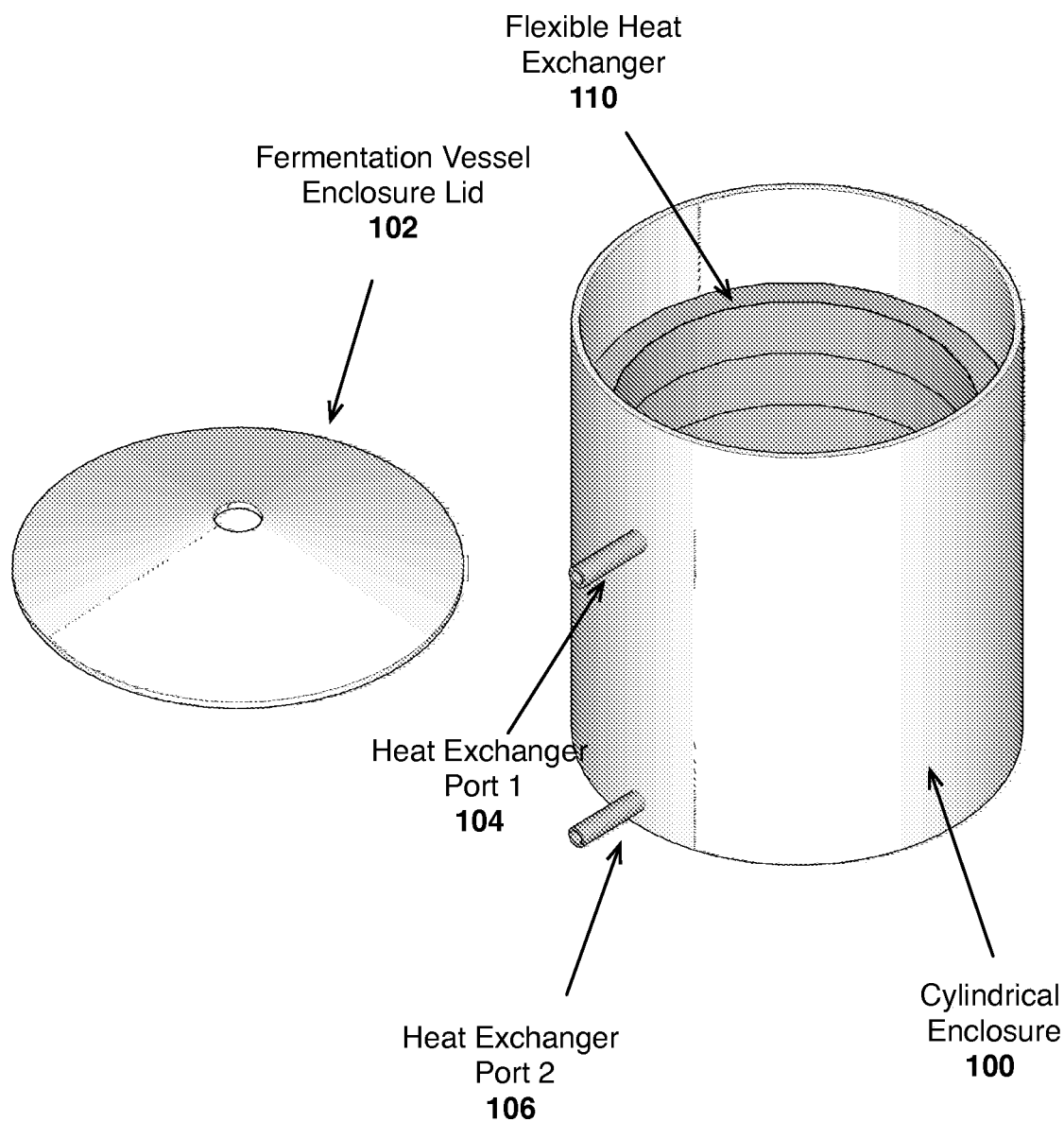

FIG. 1A and FIG. 1B are illustrations of a portable assembly including a fermentation vessel enclosure and heat exchanger, to provide thermal management for beer and wine fermentation, according to an embodiment. In one embodiment, a fermentation vessel enclosure comprises a cylindrical enclosure 100 approximately 8 mm thick that is constructed from a rigid or pliable polymer material. In one embodiment, the cylindrical enclosure 100 has outer surface of a polyester or neoprene material. The enclosure has a lid 102, which, in one embodiment, is removable from the cylindrical enclosure 100, and can include an integrated or attachable insulation layer. In one embodiment, the lid 102 is made of 8 mm thick neoprene sponge and is shaped like a truncated cone with base diameter of 368 mm, a top diameter of 57 mm, and a height of approximately 64 mm.

In the exemplary illustration of FIG. 1A, heat exchanger ports extend through openings in the sidewall of the enclosure. In one embodiment, the cylindrical enclosure 100 includes openings that are 19 mm in diameter, or otherwise sufficiently dimensioned to pass the heat exchanger ports (e.g., heat exchanger port 1 104, heat exchanger port 2 106) without creating an extensive gap in the enclosure. In one embodiment, a first opening located is 33 mm from the bottom of the enclosure 100, and a second opening is located 273 mm directly above the first port.

Other methods of exposing the heat exchanger ports are possible. In one embodiment, the heat exchanger ports are routed through one or more openings in the lid 102 of the enclosure. Via the heat exchanger ports 104, and 106, the heat exchanger can couple to input and output lines to a feed and return of thermally conductive fluid. In one embodiment, couplers 108 are used to tie the heat exchanger to the thermal fluid feed and return, and the couplers 108 can be quick disconnect couplers to facilitate the rapid assembly and disassembly of a thermal management system as described herein.

In the exemplary illustration of FIG. 1B, the fermentation vessel enclosure lid 102 is removed, allowing an inside view of the fermentation vessel enclosure 100 including a flexible heat exchanger 110, which is disposed within the cylindrical enclosure. In one embodiment, the heat exchanger is attachable to the inner wall of the enclosure 100, using a hook and loop fastener, or some other suitable fastening mechanism. In one embodiment, the heat exchanger 110 is made from heavy duty, puncture resistant polyvinyl chloride (PVC) material that is approximately 0.7 mm thick. In one embodiment, the heat exchanger 110 is approximately 991 mm long, 324 mm wide and 24 mm deep. The heat exchanger ports 104, 106 can be flexible tubes with an inner diameter of approximately 13 mm, and an outer diameter of 19 mm. In one embodiment the tubes can be up to 77 mm long.

Figure 2A:
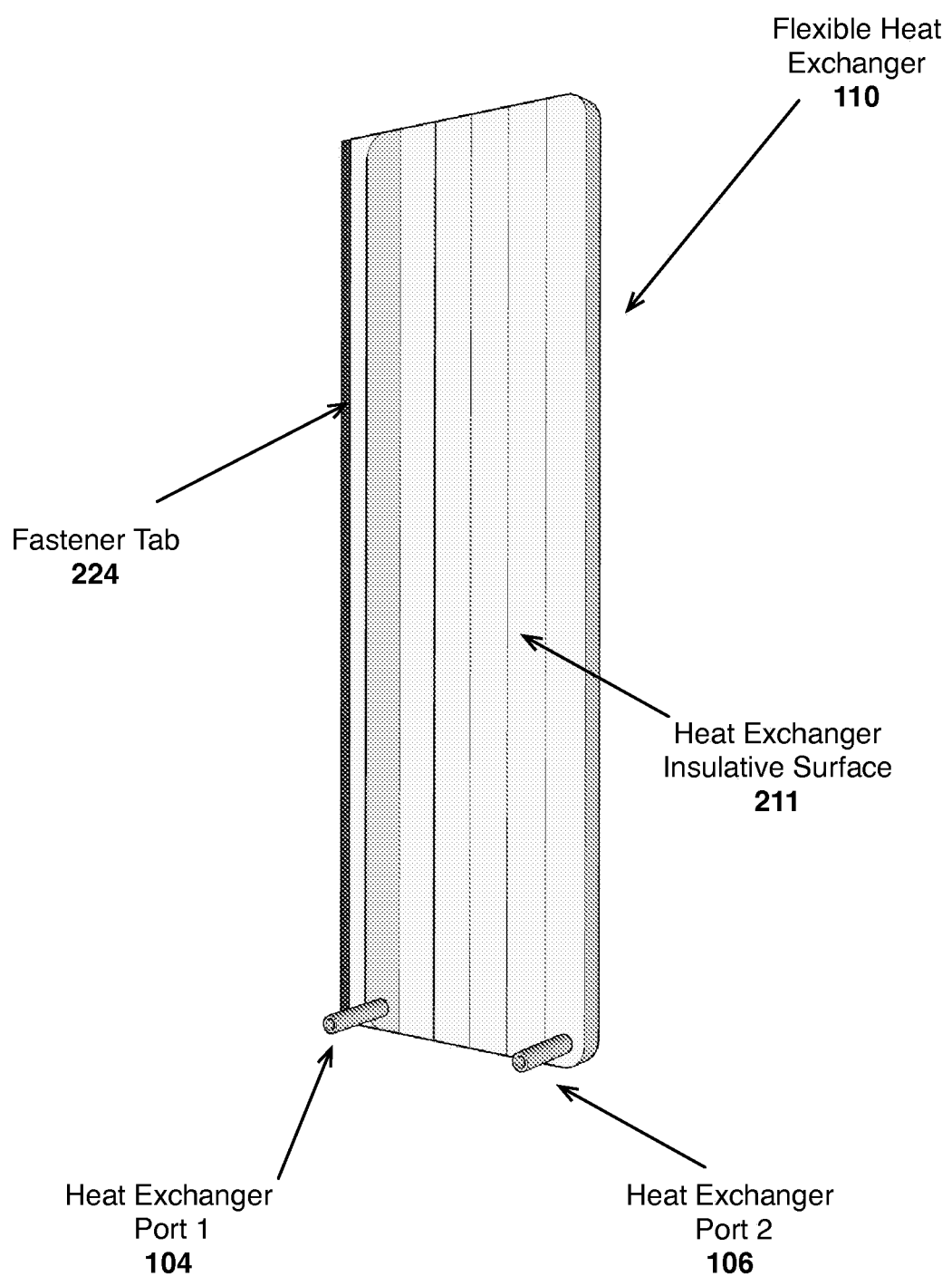
FIG. 2A and FIG. 2B are illustrations of an embodiment of a heat exchanger of a thermal management assembly for beer and wine fermentation.
Figure 2B:
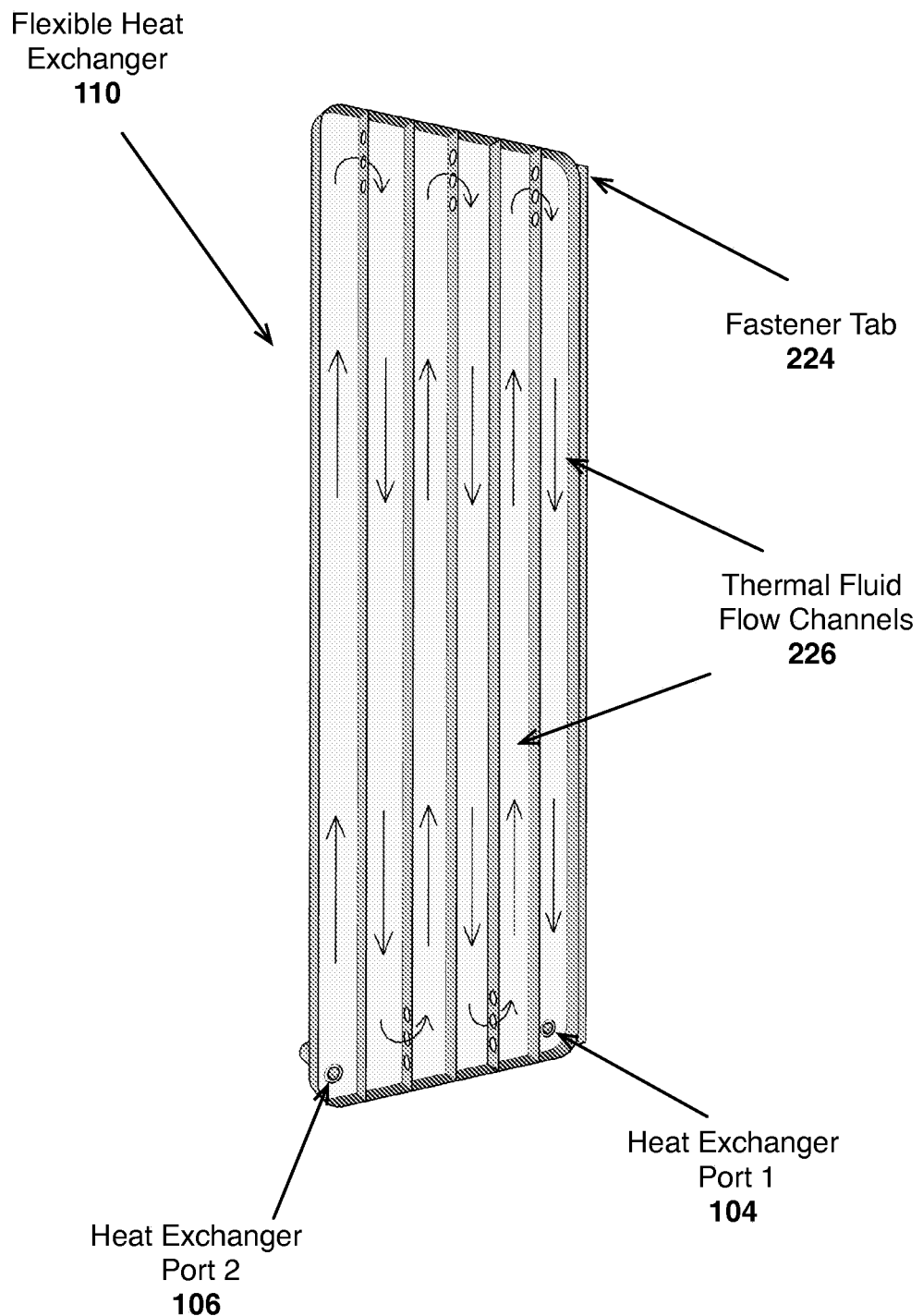

FIG. 2A and FIG. 2B are illustrations of an embodiment of a heat exchanger of a thermal management assembly for beer and wine fermentation. In one embodiment, the heat exchanger (e.g., flexible heat exchanger 110 of FIG. 1B) includes a fastener tab 224, which can be used to attach the heat exchanger 110 to the inside of an enclosure (e.g., cylindrical enclosure 100). The fastener can be a hook and loop fastener, or some other fastener system to removably attach the heat exchanger in place within the enclosure 100.

In the exemplary illustration of FIG. 2A, an embodiment of the heat exchanger 110 with an insulative surface 211 is shown, which can limit the amount of thermal loss through the surface portion of the heat exchanger opposite the fermentation vessel.

In the exemplary illustration of FIG. 2B, the internally facing surface of an embodiment of the heat exchanger 110 is shown in a cutaway view, which illustrates the thermal fluid flow channels 226 within the heat exchanger. The thermal fluid flow channels 226 can include up to six channels through which the cooling fluid flows in alternating directions within the heat exchanger 110. In one embodiment, each chamber 54 mm wide by 991 mm long, and is approximately 25 mm deep. Within each chamber, three circular ports are spaced in 25 mm increments from an end of each thermal flow channel depending on the direction of flow, to channel the thermal fluid through the length of the heat exchanger 110.

Figure 3:
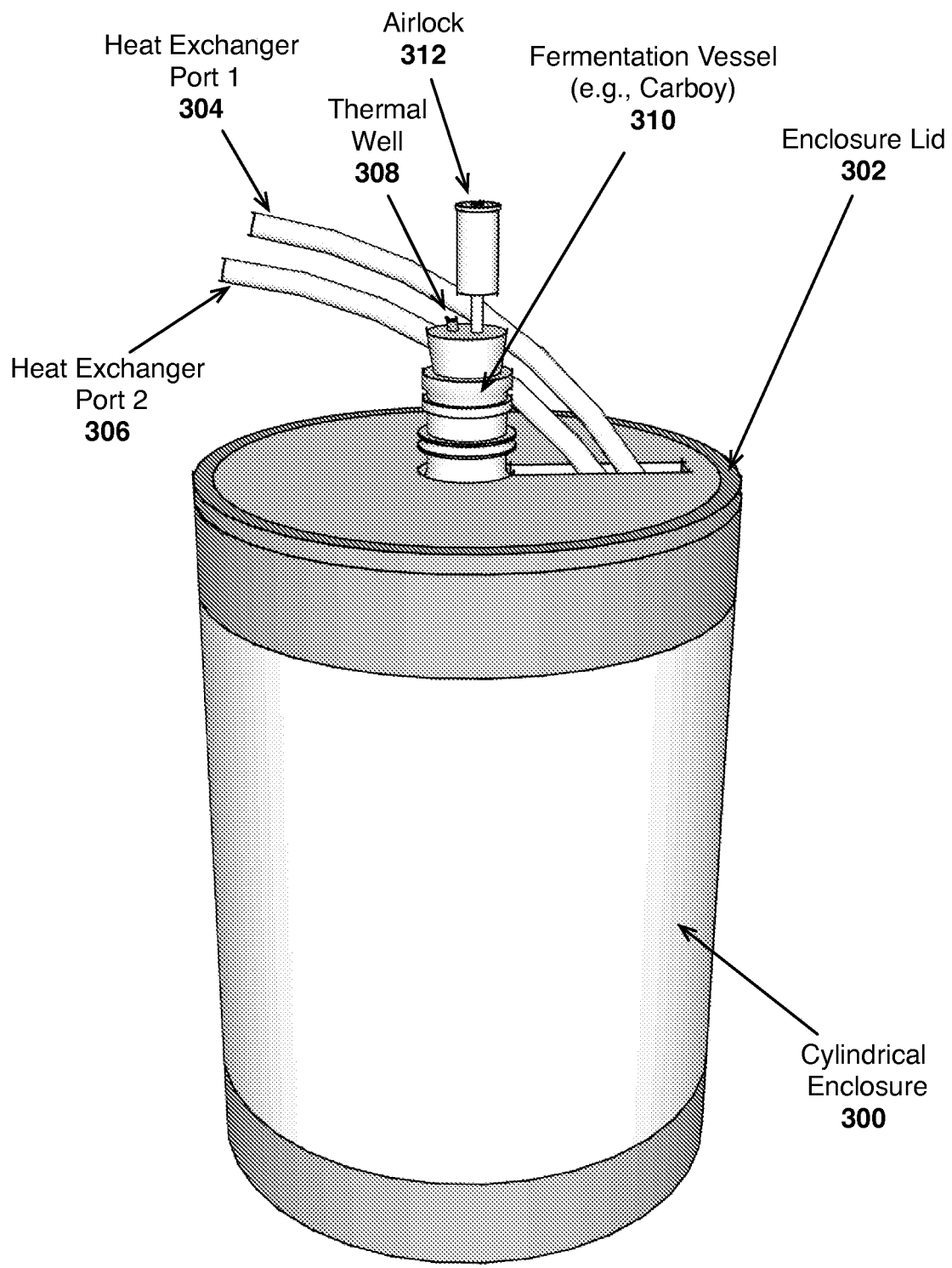
FIG. 3 is an illustration of another embodiment of a fermentation vessel enclosure and heat exchanger assembly to provide thermal management for beer and wine fermentation.

FIG. 3 is an illustration of another embodiment of a fermentation vessel enclosure and heat exchanger assembly to provide thermal management for beer and wine fermentation. In one embodiment, the cylindrical enclosure 300 of is approximately 381 mm in diameter, and approximately 483 mm tall from the bottom of the deployed enclosure 300 to the top of the sidewall. An exemplary removable enclosure lid 302 is shown having two openings, one approximately 50 mm in diameter, to allow the neck of a fermentation vessel 310, such as a "carboy" style fermentation vessel, to extend through the lid 302 of the enclosure. The neck of the fermentation vessel 310 can include an airlock 312, to safely release gasses generated within the fermentation vessel 310 during fermentation, and a thermal well 308, to accept a thermal probe, to provide a temperature sensing mechanism for the inside of the fermentation vessel 310. In one embodiment, the enclosure 300 and heat exchanger ports 304, 306, are arranged such that heat exchanger thermal fluid feed and return is routed through an opening in the enclosure lid 302. In one embodiment, the enclosure and heat exchanger assembly of FIG. 3 is configured to be interchangeable with an embodiment of the enclosure and heat exchanger assembly as illustrated in FIG. 1A and FIG. 1B.

Figure 4A:
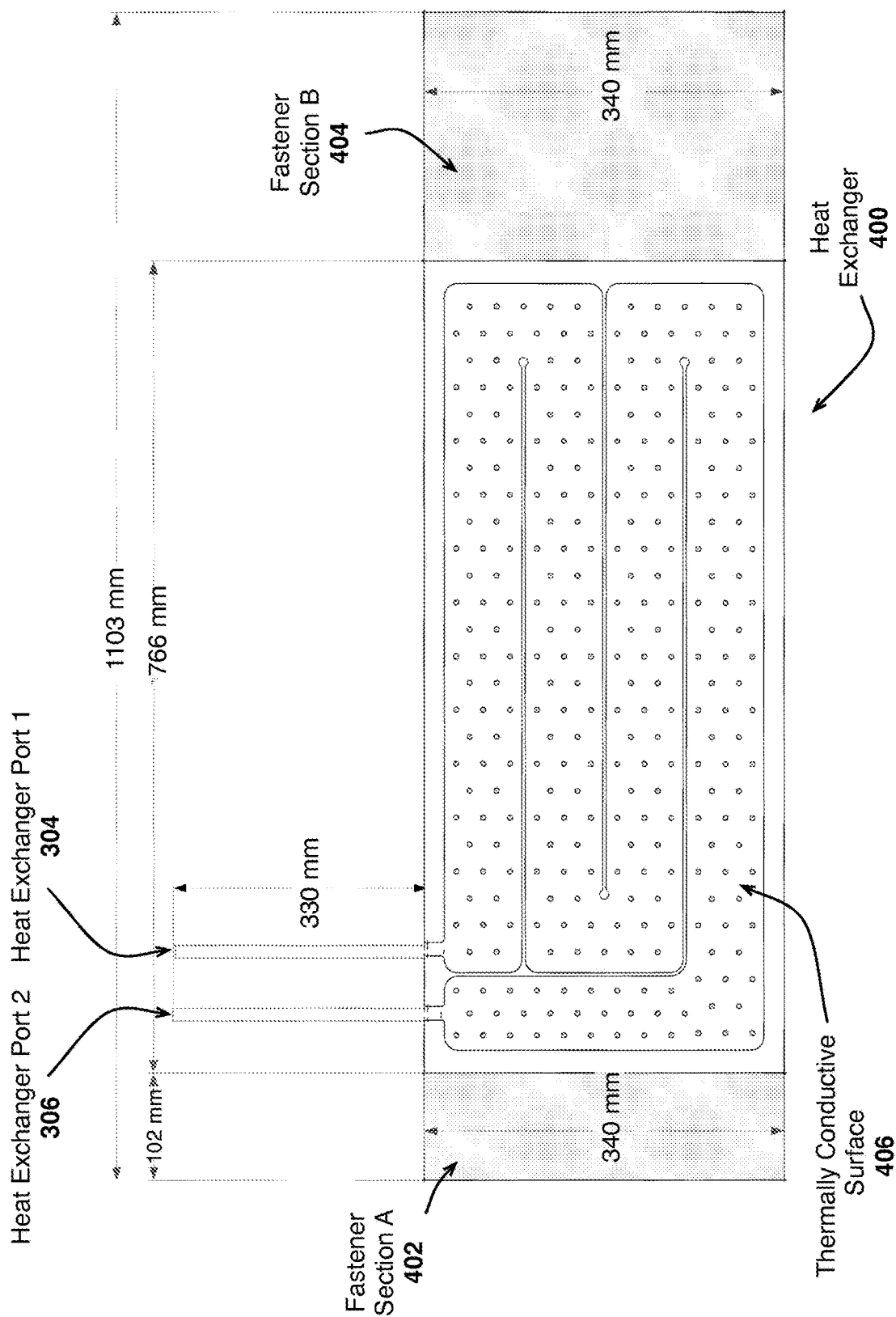
FIGS. 4A through 4C are illustrations of the heat exchanger of another embodiment of a thermal management assembly for beer and wine fermentation.
Figure 4B:
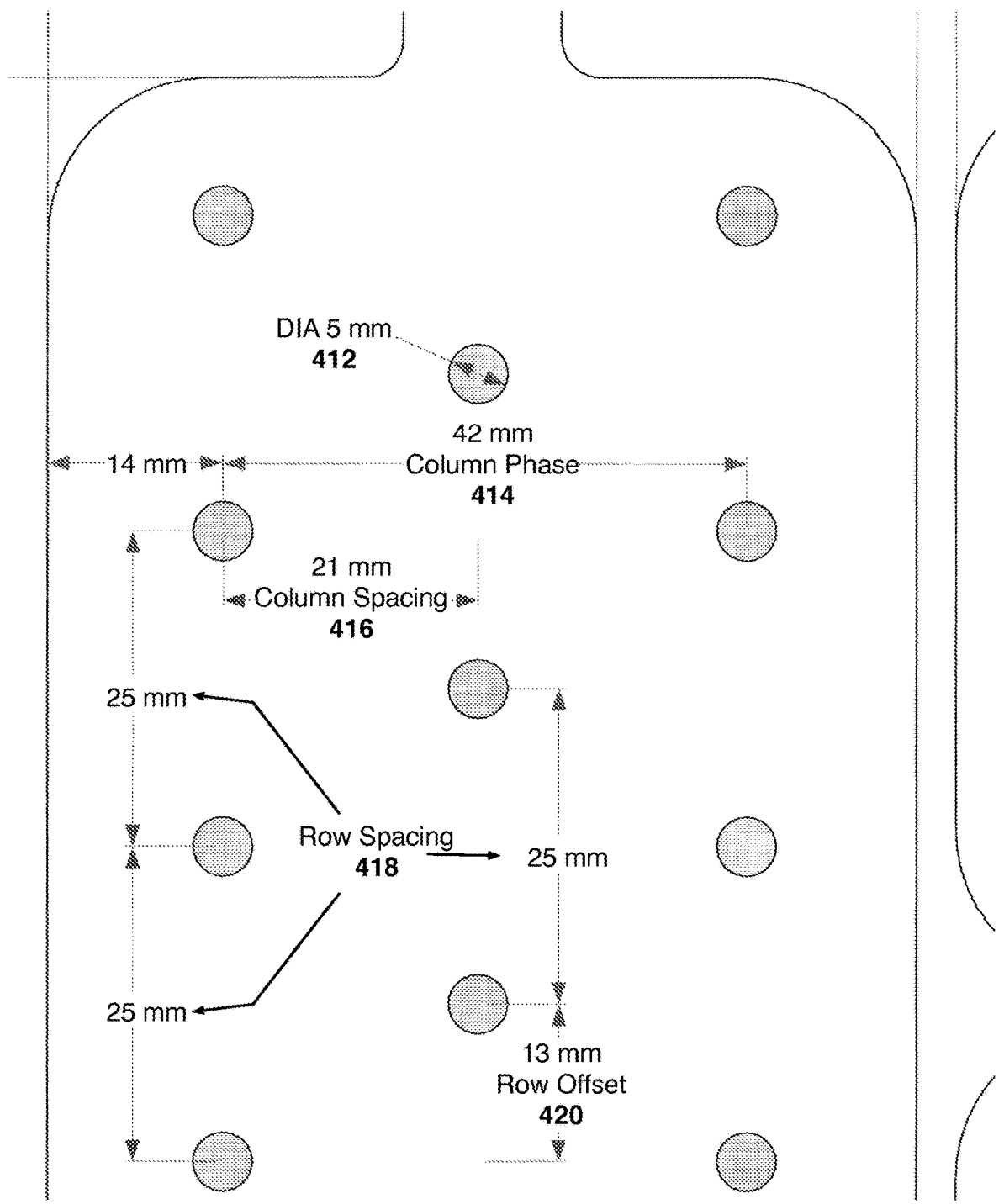
Figure 4C:
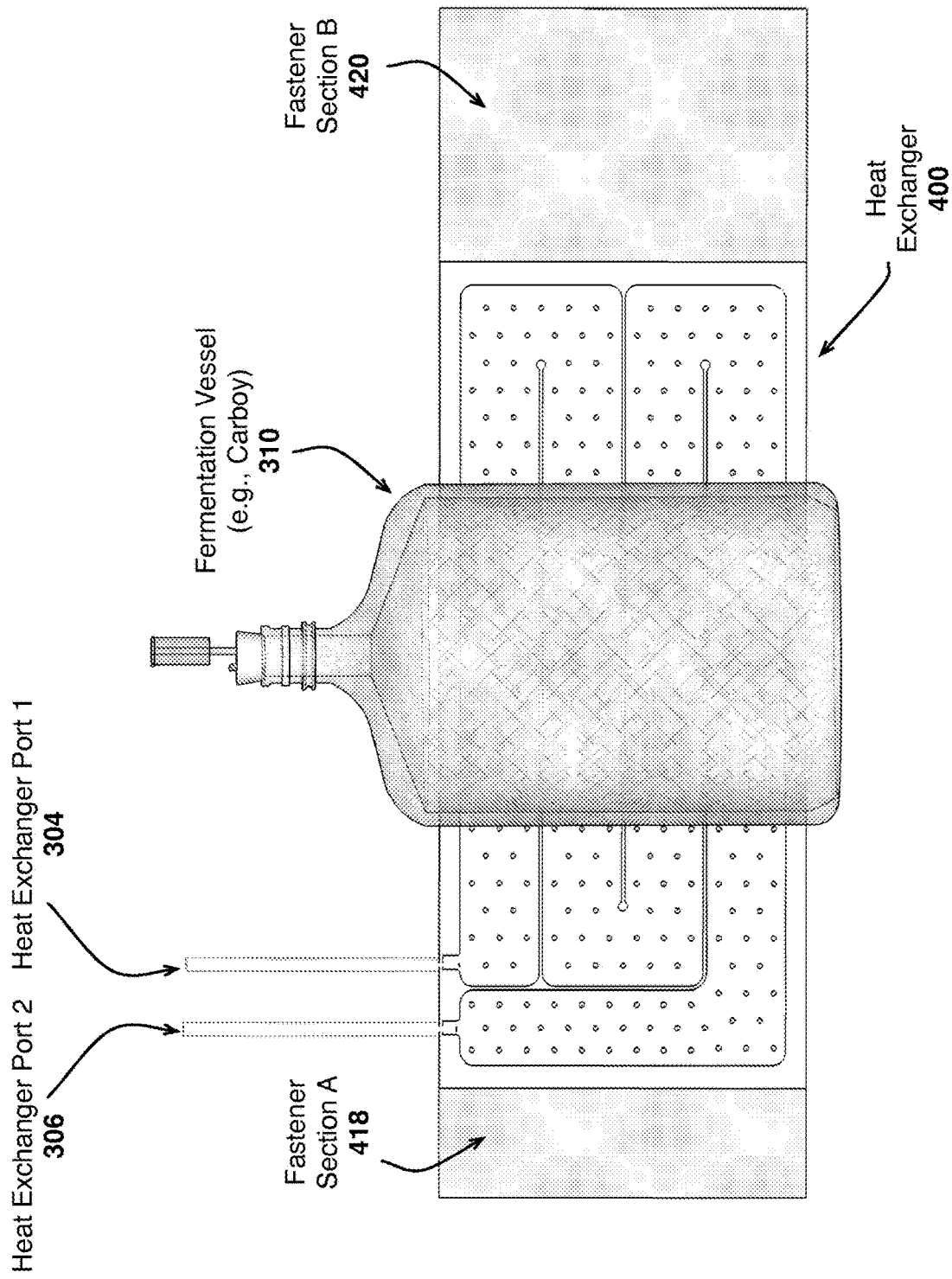

FIGS. 4A through 4C are illustrations of an additional embodiment of a heat exchanger for a thermal management assembly for beer and wine fermentation. The flexible heat exchanger 400 is constructed from a flexible sheet material sealed in a manner appropriate for the material being used, such that a channel is formed along the heat exchanger 400 such that a thermally conductive surface 406 can transfer thermal energy away from or into a thermally conductive fluid flowing through the heat exchanger. The heat exchanger has a first port 304 and a second port 306, and either of the ports can alternately be a fluid feed or fluid return depending on the direction of fluid flow through the heat exchanger 400.

In the exemplary illustration of FIG. 4A, a flexible heat exchanger 400 is depicted, which is approximately 1103 mm long, including the fastener sections (e.g., fastener section A 402, fastener section B 404), and approximately 340 mm wide. The ports of the heat exchanger 400, in the exemplary embodiment, are positioned in the upper left portion of the flattened, uninstalled heat exchanger, and have a 6 mm inner diameter. The ports can be up to 330 mm long. Fastener section A 402, and fastener section B 404 can be complementary sections of a hook and loop fastener, such that fastener section A 402 can couple with fastener section B 404 when wrapped around and secured to a fermentation vessel. In one embodiment, multiple heat exchangers can be coupled to encompass a fermentation vessel of larger size than the standard 15-liter to 25-liter fermentation vessel used in small-scale fermentation. An embodiment of the heat exchanger can also include an insulating layer opposite the thermally conductive surface 406, to provide, or supplement the insulation attached to, or incorporated within the enclosure shell.

The exemplary illustration of FIG. 4B shows a closer view of the heat exchanger 400, in which the thermally conductive surface 406 is welded to an internal layer in a specific pattern, to prevent the flexible material of the heat exchanger from ballooning due to the fluid flowing through the fluid channels. The flexible construction of the heat exchanger 400 allows the sides of the fermentation vessel 310 to be wrapped. However, the hydrodynamic pressure of the thermal fluid flowing through the heat exchanger can cause a ballooning effect, where the heat exchanger expands in thickness when filled with fluid, reducing the contact area of the thermally conductive surface. The welding pattern illustrated limits the degree to which the heat exchanger 400 can expand in thickness, and limits the contraction of the contact surface of the heat exchanger during periods of thermal fluid flow.

In one embodiment, the thermal surface and an inner surface of the heat exchanger 400 are welded using a technique suitable for polymer materials, and the weld points include multiple circular welds approximately 5 mm in diameter 412. An embodiment can arrange the weld points in an offset pattern of columns and rows, with column spacing 416 of 21 mm, column phase 414 of 42 mm, and row spacing 418 of 25 mm. The columns can be arranged beginning 14 mm from the leftmost edge of a fluid channel, and the alternating columns can be arranged with a 13 mm row offset 420 between columns. In one embodiment, the weld pattern can be uniform across the thermally conductive surface 406 of the heat exchanger. In one embodiment, the weld pattern can be adjusted between fluid channels as needed to for efficiency.

In the exemplary illustration of FIG. 4C, an embodiment of a flexible heat exchanger 400 is depicted in position to attach to a fermentation vessel 310, such as a carboy style fermentation vessel. Heat exchanger port 1 304 and heat exchanger port 2 306 are positioned pointing upwards, and the heat exchanger 400 is wrapped around the external surface of the fermentation vessel 310. Fastener section A 418 and fastener section B 420 can be complementary sections of a fastener, such as a hook and loop fastener, or another suitable fastening mechanism, such as a strap and buckle mechanism.

Figure 5:
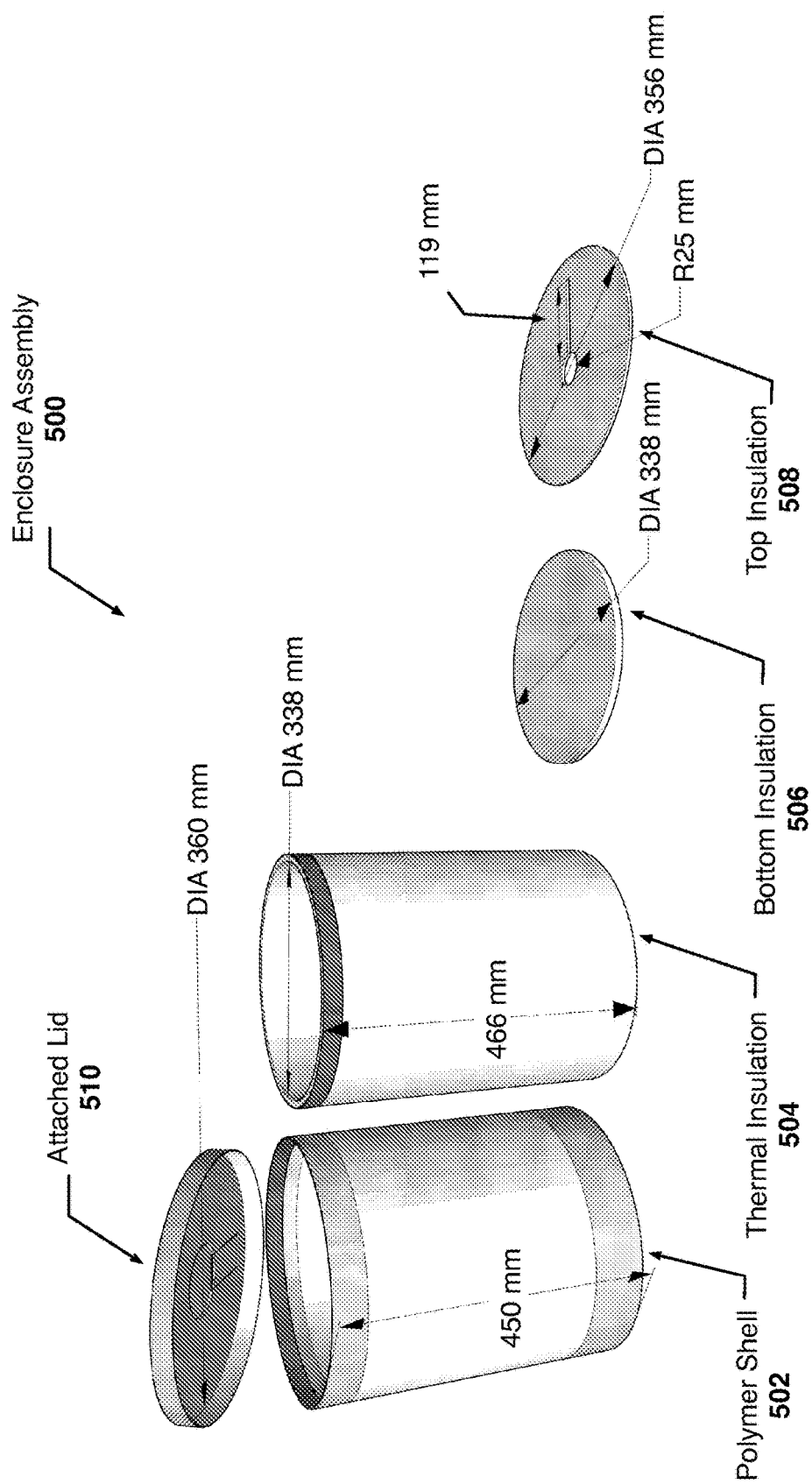
FIG. 5 is an illustration of another embodiment of a fermentation vessel enclosure and insulation for a thermal management assembly for beer and wine fermentation.

FIG. 5 is an illustration of another embodiment of a fermentation vessel enclosure and insulation for a thermal management assembly for beer and wine fermentation. In one embodiment, an enclosure assembly 500 is constructed from a collapsible polymer shell 502 with cylindrical body and an attached lid 510. The polymer shell, when fully deployed, can extend for 450 mm from the base of the shell to the top of the cylindrical section. The attached lid 510 has a diameter of 360 mm, and can have one or more openings which allow a heat exchanger, such as heat exchanger 400, to extend fluid feed and fluid return lines through the attached lid 510.

In one embodiment, the fermentation vessel enclosure assembly 500 can feature a set of insulating layers, such as thermal insulating layer 504, for the polymer shell 502, including a bottom insulation layer 506, and a top insulation layer 508. The thermal insulation layer 504 can be inserted into the polymer shell 502, and stands 466 mm, to provide side insulation for a fermenter (e.g., fermentation vessel 310), where the side insulation extends above the walls of the polymer shell to additionally insulate the side walls of the attached lid 510 when the attached lid 510 is closed. The thermal insulation layer 504 has an inner diameter of 338 mm, which, in one embodiment, is equal to the diameter of the bottom insulation layer 506, which can provide thermal insulation beneath the fermenter when the fermenter is enclosed within the deployed and insulated polymer shell 502 of an embodiment of the fermentation vessel enclosure assembly 500. An embodiment of the top insulation layer 508 features a cutout center circular section with a radius of 25 mm, to allow the neck of the fermenter to extend through the insulation. A rectangular cutout section 119 mm in length joins with the center cutout section, to allow the heat exchanger feed and drain lines to route through the attached lid 510.

Figure 6:
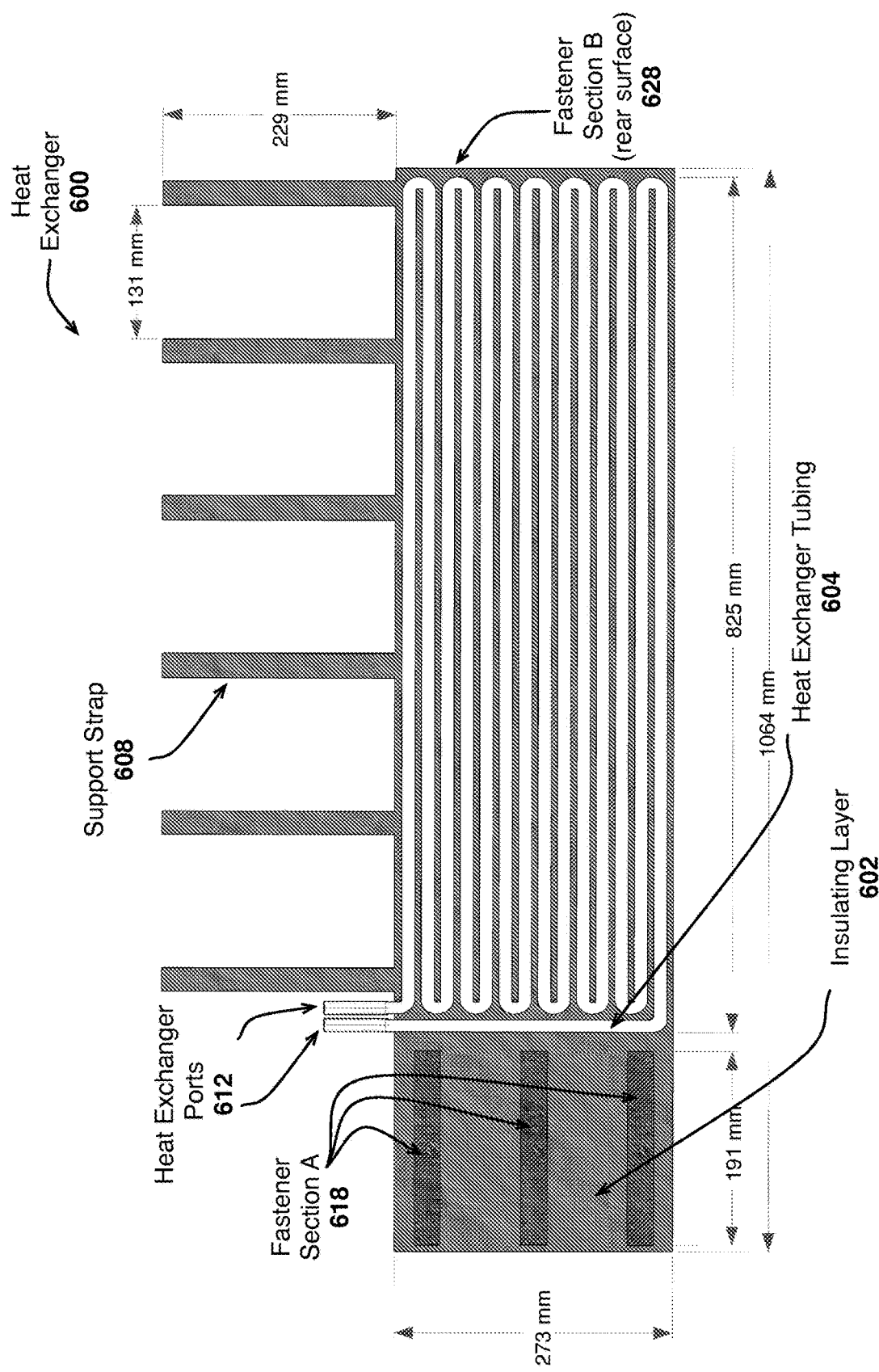
FIG. 6 is an illustration of another embodiment of the heat exchanger for a thermal management assembly for beer and wine fermentation.

FIG. 6 is an illustration of another embodiment of a heat exchanger for a thermal management assembly for beer and wine fermentation. In one embodiment, the heat exchanger (e.g., heat exchanger 600) is constructed from various compounds of polyurethane and neoprene, and provides a thermally conductive surface and a thermally insulating surface opposite of the thermally conductive surface. Similarly to other heat exchanger embodiments described (e.g., heat exchanger 110, heat exchanger 400), a thermally conductive fluid is pumped, or otherwise flows into and out of a set of heat exchanger ports 612 through heat exchanger tubing 604. The heat exchanger tubing 604 can be constructed from a flexible compound of polyurethane, or another flexible polymer compound suitable for heat exchanger construction, and provides a flow path for the thermally conductive fluid. An additional polymer compound, such as neoprene, an insulating polyurethane compound, or some other polymer insulating material, can be used to form an insulating layer 602, to limit heat transfer through the external surface of the heat exchanger 600.

In the exemplary illustration of FIG. 6, the heat exchanger 600 is 273 mm tall, and has a total length of 1064 mm, including an 825 mm long section of heat exchanger tubing 604 and an 191 mm long fastener section (e.g., fastener section A 618), which has a hook and loop style fastener portion, to couple with an additional fastener section (e.g., fastener section B 628) when wrapped, or otherwise attached to a fermenter.

In one embodiment, the insulating layer can be sufficiently insulating to allow the heat exchanger to be fastened to free standing conical fermenter without employing an enclosure (e.g., enclosure 100, 300, enclosure assembly 500). An embodiment of the heat exchanger 600 can be sized as appropriate for smooth walled, freestanding conical fermenters of various sizes as used in small-scale beer and wine production, from 28 liters, up to and including 103 liters. In one embodiment, one or more support straps 608, which utilize a hook and loop, or other fastening means, can be utilized to anchor the heat exchanger to the top of a conical fermenter. In one embodiment, the one or more support straps can include buckles as fastening means. In the exemplary illustration of FIG. 6, the support straps are spaced 131 mm apart, and can be up to 229 mm in length, though alternate lengths and placement can be utilized based on the size of the fermenter in use. While FIG. 6 illustrates vertically oriented straps, in various embodiments, the straps can be vertically or horizontally oriented straps. In one embodiment the fastener section 618 can includes straps and buckles as an alternative to a hook-and-loop fastener.

Figure 7:
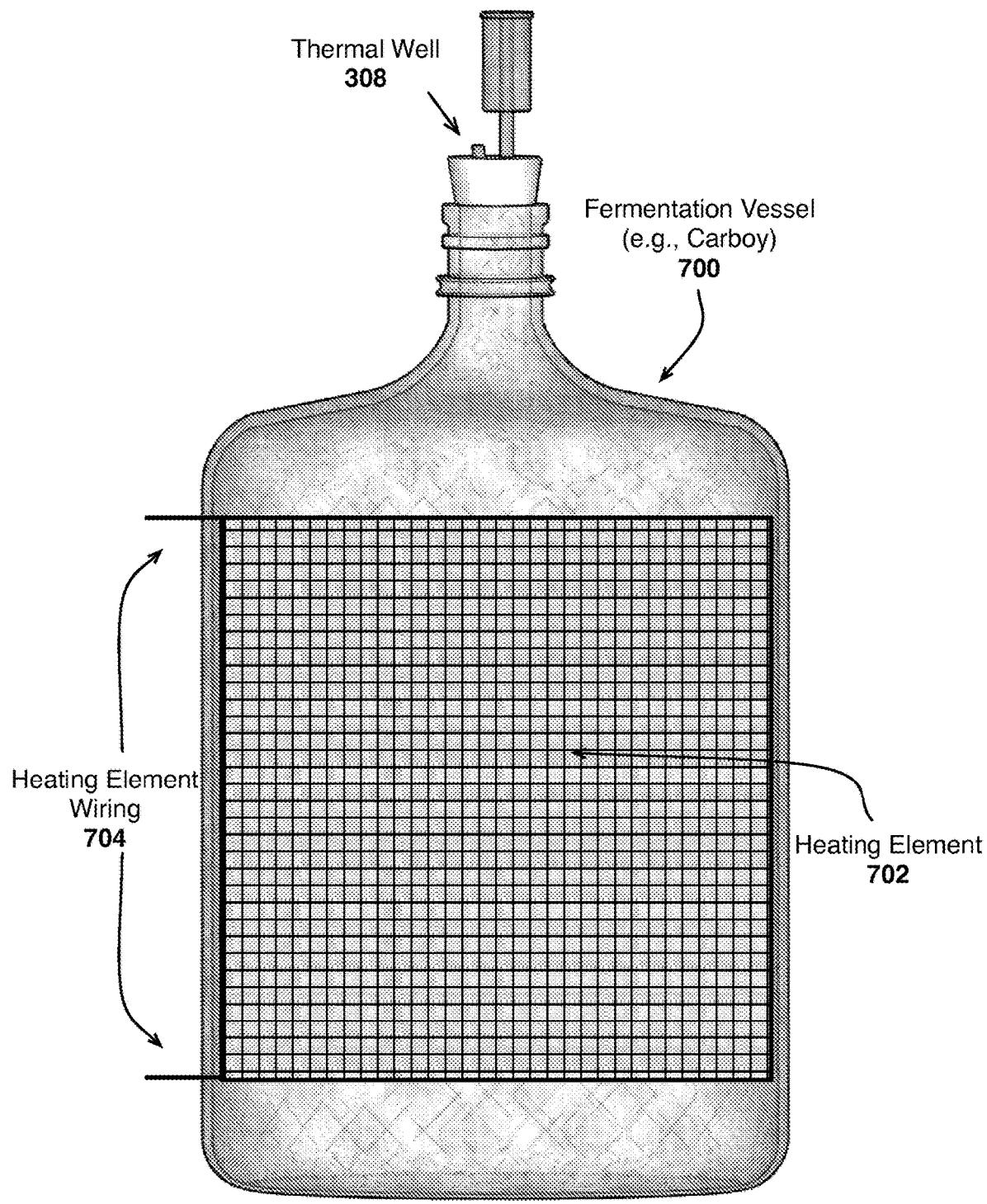
FIG. 7 is an illustration of a heating element for heating a fermentation vessel in a thermal management system for beer and wine fermentation, according to an embodiment.

FIG. 7 is an illustration of a heating element for heating a fermentation vessel in a thermal management system for beer and wine fermentation, according to an embodiment. The fermentation process is generally an exothermic reaction, and heat can be generated naturally. However, in environments with low ambient temperatures, some degree of additional heat may be introduced into a fermenting beer or wine to prevent the yeast from becoming dormant if the ambient temperature is sufficiently low enough to counteract the exothermic fermentation reaction. As an alternative, or failsafe component of an embodiment of a fermentation temperature control system using a thermostatically controlled thermal fluid, one embodiment can utilize a heating element (e.g., heating element 702) to introduce additional thermal energy into the fermentation process.

The heating element 702 can be controlled by a temperature controller coupled to a temperature sensor, such as a thermal probe inserted into a thermal well 308 of a fermenter, such as the variant of a carboy fermentation vessel 700, as illustrated in FIG. 7. When the temperature sensor indicates that the temperature inside of the fermentation vessel 700 is below a minimum threshold, the temperature controller can activate a circuit, which provides power to the heating element wiring 704, activating the heating element until the temperature inside of the fermenter reaches a programmed temperature. In one embodiment, a heating element 702 is used in conjunction with a heat exchanger (e.g., one of heat exchanger 110, 400, 600), and the heat exchanger is dedicated to cooling the fermentation vessel 700 using a cooling fluid, such as water or glycol based coolant. A multi-stage temperature controller can be used in a temperature control system to control an embodiment of a heat exchanger, in addition to one or more heating elements 702 as needed.

Various embodiments of a thermal management system for managing the temperature of a fermentation vessel during beer or wine fermentation are illustrated in FIG. 8 through FIG. 11, and described below. The particular configuration of each system illustrated is exemplary, and not intended to be limiting, as various components from one system may be interchangeable with other systems illustrated or described herein.

Figure 8:
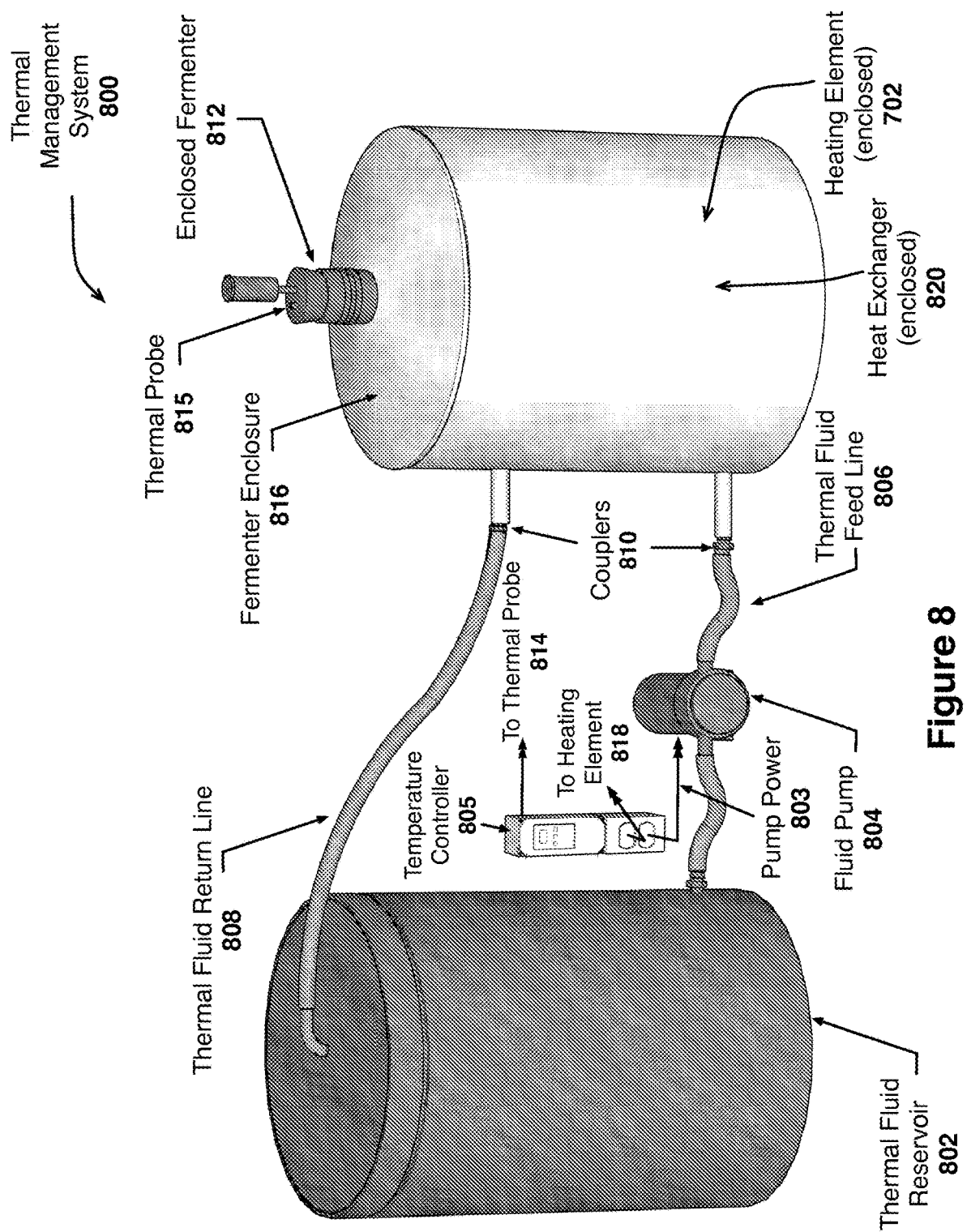
FIG. 8 is an illustration of an embodiment of a thermal management system for beer and wine fermentation.

FIG. 8 is an illustration of an embodiment of a thermal management system for beer and wine fermentation. An embodiment of thermal management system 800 includes a fermenter enclosure assembly 816 with an enclosed fermenter 812, heat exchanger 820, and optionally, an enclosed heating element 702. Enclosed heat exchanger 820 can be an embodiment of heat exchanger 110, or equivalent. The enclosed fermenter 812 includes a thermal well, into which a thermal probe 815 can be inserted, to sample the temperature inside of the fermentation vessel during fermentation. The thermal probe is coupled to a sensor port (e.g., to thermal probe 815) of a temperature controller 805, which can be a multi-stage temperature controller, such as a dual stage temperature controller, to control both the optional heating element 702, as well as a fluid pump 804. As indicated by the thermal probe 815, and based on a programmable thermal profile, the temperature controller 805 can activate the optional heating element 702 installed on the enclosed fermenter 812, or supply power 803 to the fluid pump 804, to pump a thermally conductive fluid from a thermal fluid reservoir 802 through a thermal fluid feed line 806, which supplies, in one embodiment, a cooled thermal fluid to the enclosed heat exchanger 820.

In one embodiment, the thermal fluid feed line 806 and thermal fluid return line 808 are coupled to the heat exchanger 820 via couplers 810, which can be quick disconnect couplers, to facilitate rapid assembly and disassembly of the thermal management system 800, which, in one embodiment, is designed to be easily portable. The thermal fluid reservoir 802 can also be configured with quick disconnect couplers, and, in one embodiment, can also be designed to be easily portable.

Figure 9:
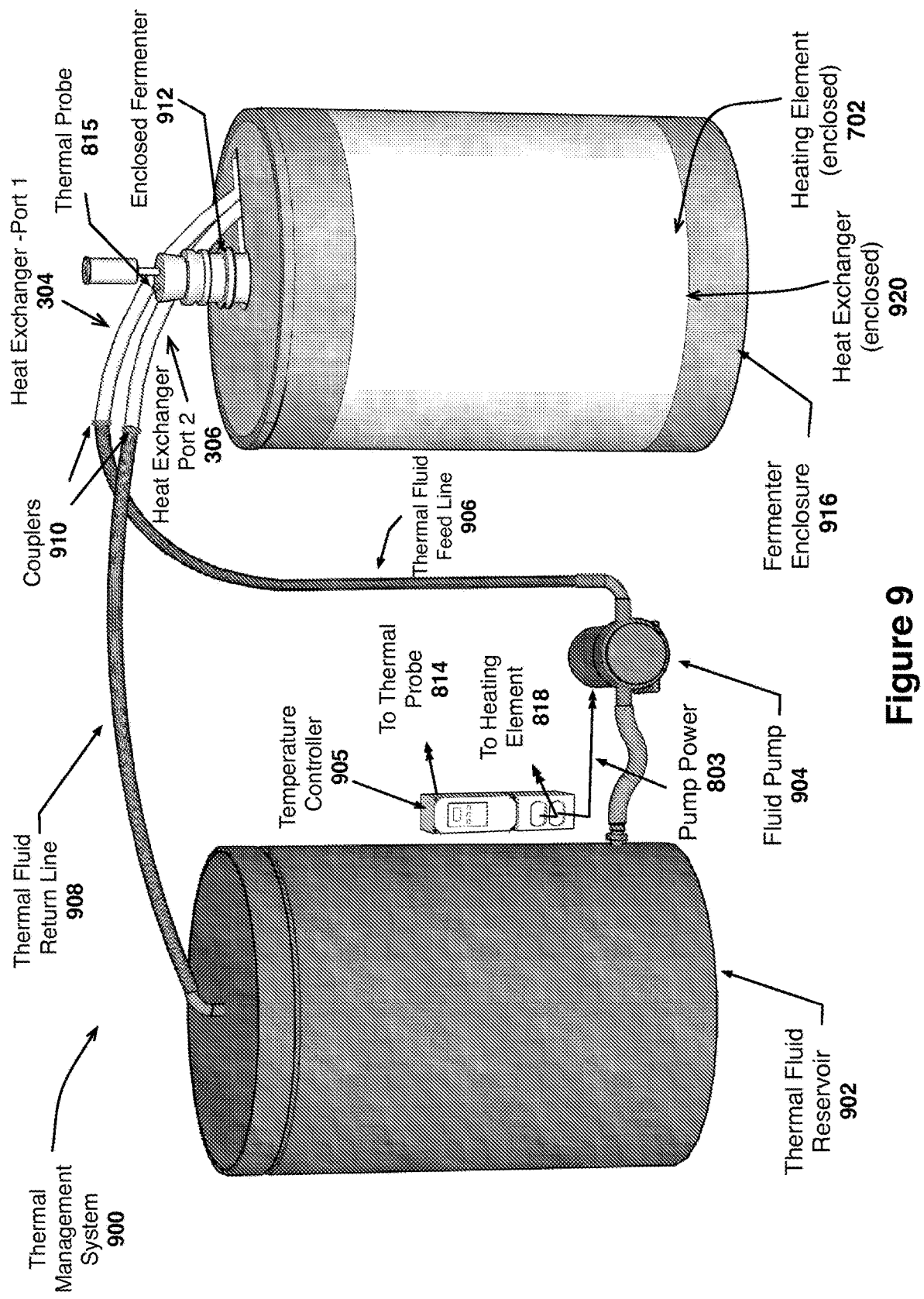
FIG. 9 is an illustration of another embodiment of a thermal management system for beer and wine fermentation.

FIG. 9 is an illustration of another embodiment of a thermal management system for beer and wine fermentation. In one embodiment, a thermal management system 900 can be assembled using an embodiment of a cylindrical enclosure 916, which is similar to cylindrical enclosure 300, with integrated insulating layers, or is similar to enclosure assembly 500, with removable insulation layers. In one embodiment, a heat exchanger 920 is coupled to, and enclosed with the enclosed fermenter 912. The heat exchanger can be an embodiment of heat exchanger 400, as illustrated in FIG. 4A through FIG. 4C 920. Additionally, heating element 702 can couple with the enclosed fermenter 912.

In one embodiment, heat exchanger ports, such as the first heat exchanger port 304 and second heat exchanger port 306 of FIG. 3, can extend through the lid (e.g., enclosure lid 302 of FIG. 3) of the fermenter enclosure 916, and couple to a thermal fluid feed line 906 and thermal fluid return line 908 via couplers 910, which can be quick disconnect couplers. In one embodiment, temperature controller 905 is a multi-stage temperature controller with a wired or wireless electromagnetic coupling 814 to thermal probe 815. The temperature controller 905 can be programmed to provide power to a heating element output 818 to the enclosed heating element 702, or a fluid pump power output 803 to a fluid pump 904.

In one embodiment, fluid pump 904 is one of several food grade fluid pumps, such as a magnetically coupled food grade pump suitable for pumping beer or wort. Food grade pumps can be used to minimize the likelihood of contamination of the thermal fluid with pump lubricants, which can contaminate the brewing environment.

Figure 10:
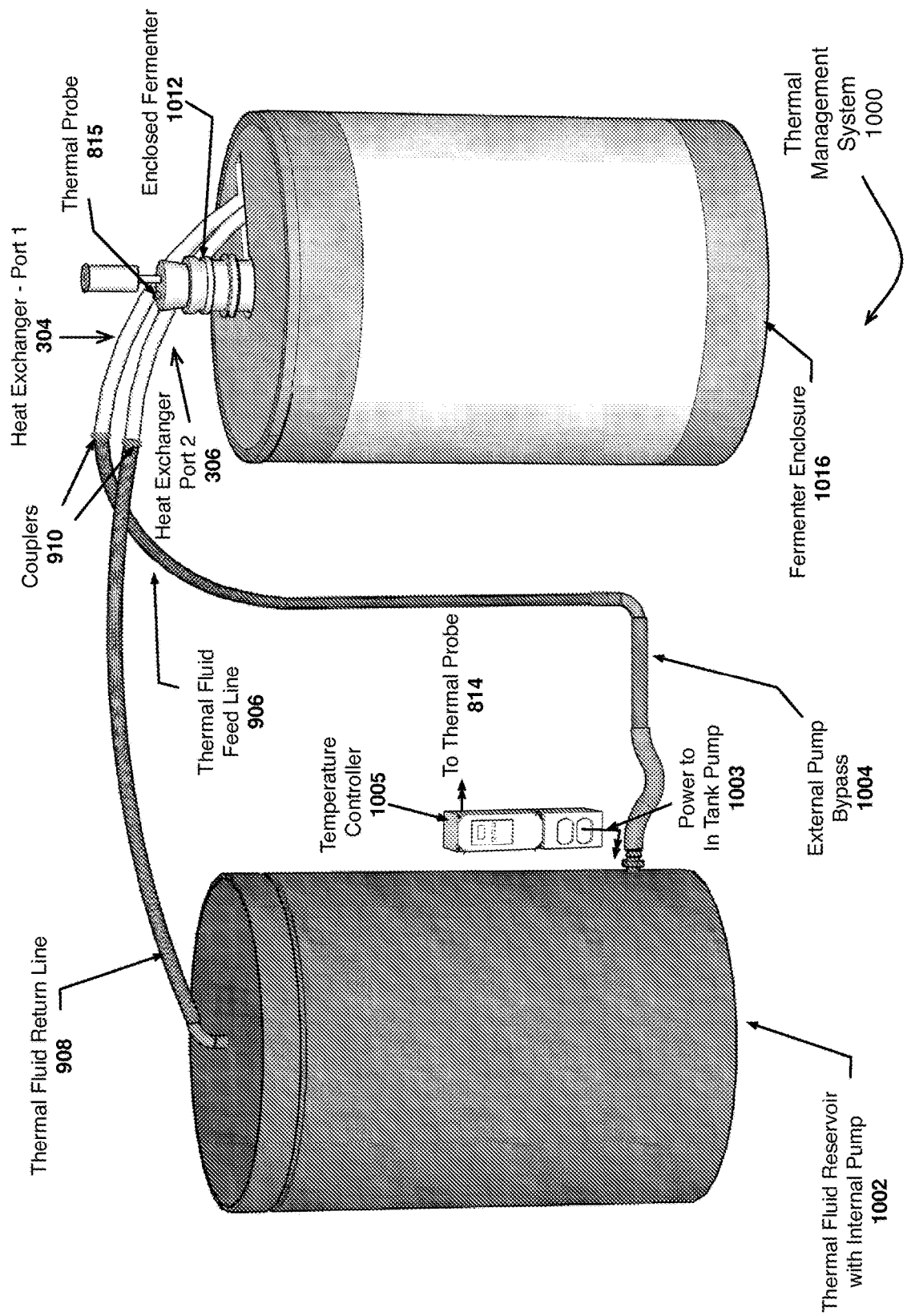
FIG. 10 is an illustration of yet another embodiment of a thermal management system for beer and wine fermentation.

FIG. 10 is an illustration of yet another embodiment of a thermal management system for beer and wine fermentation. In one embodiment, a thermal management system 1000 can be assembled a fermenter enclosure 1016, which can be one, or an equivalent to one of several fermenter enclosures as described herein. The enclosed fermenter 1012 can be one of several flat bottom fermenters, such as a carboy fermenter, (e.g., fermentation vessel 310, fermentation vessel 700), or a bucket fermenter. Where the fermenting environment permits, an embodiment of the temperature management system 1000 can operate without a heating element, and a single stage temperature controller 1005 to control the flow of thermal fluid is sufficient to provide proper thermal management. Accordingly, the temperature controller 1005 of FIG. 10 can include a wired or wireless electromagnetic coupling 814 to a thermal probe 815, or other heat sensor, to detect the temperature inside of the enclosed fermenter 1012, and a power connection 1003 to a fluid pump, which can be, in one embodiment, a submersible in take pump of a thermal reservoir 1002 with an internal pump. In one embodiment, a thermal fluid reservoir 1002 with internal pump has a fluid pump coupled to an output of the fluid reservoir. In one embodiment, the output couples to the thermal fluid feed line 906 and a thermal fluid return line 908 in an interchangeable manner with thermal fluid reservoir 902 by the use of a pressurized side mounted output coupled to an external pump bypass 1004, where the side mounted output is pressurized by the internal pump of the thermal fluid reservoir 1002.

Figure 11:
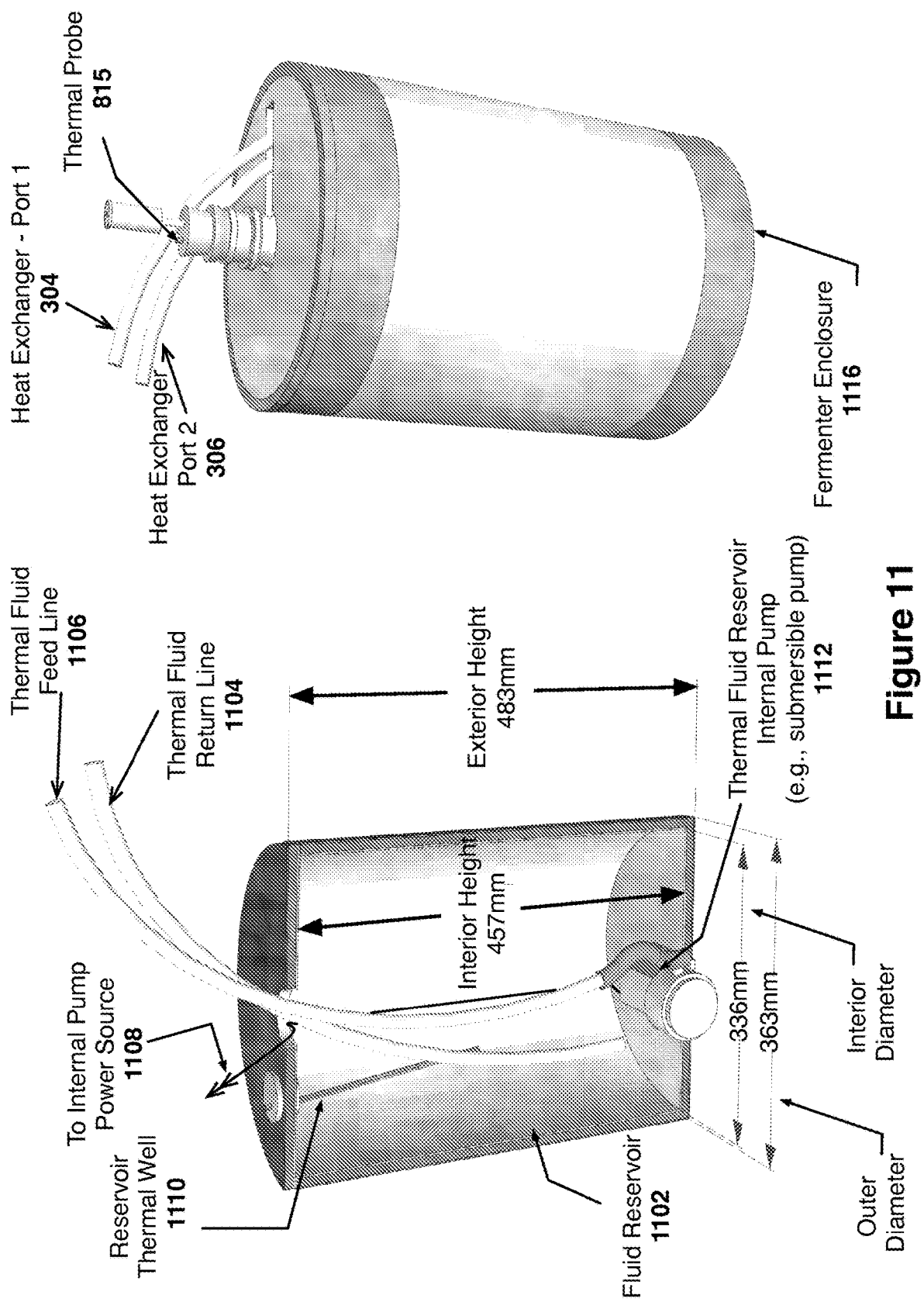
FIG. 11 is an illustration of components of an embodiment of a thermal management system for beer and wine fermentation.

FIG. 11 is an illustration of components of an embodiment of a thermal management system for beer and wine fermentation. An embodiment of a thermal fluid reservoir 1102 similar to thermal fluid reservoir 1002 is illustrated in cutaway view. The reservoir 1102 can feature a submersible internal pump 1112. In one embodiment, the internal pump 1112 is coupled to a thermal fluid feed line 1106 to pump a thermal fluid to the embodiment of the heat exchanger coupled to an enclosed fermenter, or to the internal walls of an embodiment of a fermenter enclosure (e.g., fermenter enclosure 1116), which can be any of the fermentation vessel enclosures (e.g., 100, 300), enclosure assemblies (e.g., 500), or equivalent as described herein. A thermal fluid return line 1104 can also extend through the top of the fluid reservoir. In one embodiment, due to the complementary top exiting nature of the fluid lines, thermal fluid feed line 1106 and thermal fluid return line 1104 can be most easily couple to a heat exchanger port 1 304 and heat exchanger port 2 306 of a heat exchanger similar to an embodiment of heat exchanger 400.

In the exemplary illustration of FIG. 11, a thermal fluid reservoir is shown as a cylindrical enclosure having an interior height of 457 mm, an exterior height of 483 mm, an inner diameter of 336 mm, and an outer diameter of 363 mm. The walls of the fluid reservoir are 27 mm thick, and can be constructed from an insulating polymer material. A power source 1108 for the internal pump can be routed through the top of the reservoir and coupled to a single stage or multiple stage temperature controller, to provide power to the submersible internal pump 1112 at programmed intervals based on output from a thermal probe 815 of the fermentation vessel. In one embodiment, the reservoir has a thermal well 1110 into which a thermal probe can be inserted, to monitor the internal temperature of the fluid reservoir 1102. A thermal probe inserted into the reservoir thermal well can enable a secondary temperature control system to manager the temperature within the thermal fluid reservoir 1102, if the thermal fluid reservoir 1102 is to be thermostatically controlled to maintain the thermal fluid at a specific, pre-determined temperature.

Figure 12:
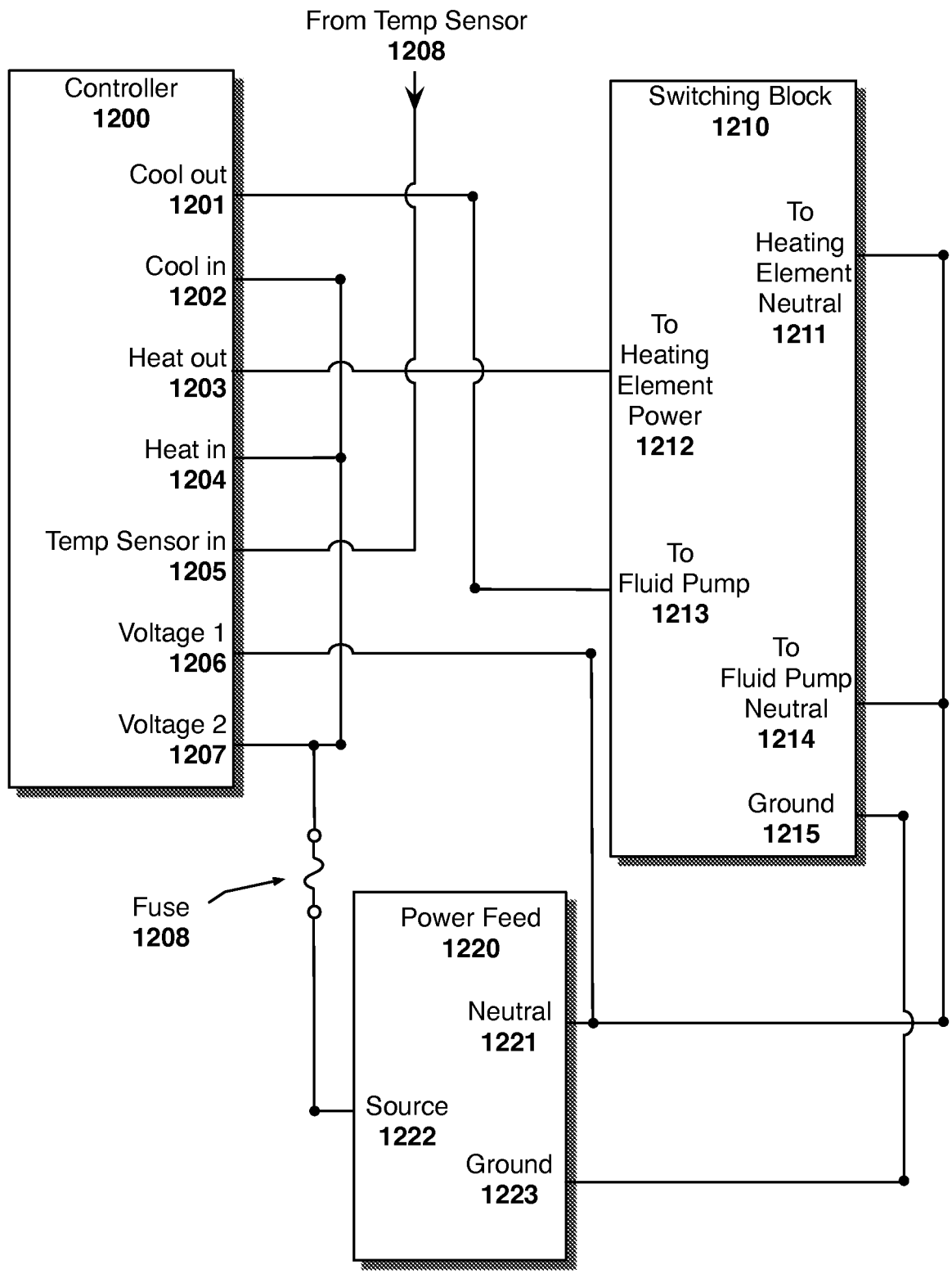
FIG. 12 is a circuit diagram for temperature controller for an embodiment of a thermal management system for beer and wine fermentation.

FIG. 12 is a circuit diagram of a temperature controller for an embodiment of a thermal management system for beer and wine fermentation. A temperature controller (e.g., temperature controller 805, 905, 1005) can be configured to control power flow to a heating element (e.g., heating element 702), and one of several embodiments of a fluid pump (e.g., fluid pump 804, 904, 1112) based on a programmed temperature profile. The exemplary temperature controller circuit illustrated includes a controller circuit 1200, which can be an integrated circuit component, a switching block 1210 which can contain one or more switching relays, and a power feed block 1220, to supply input power to the controller.

The power feed block 1220 is tied to a source of power, such as an electrical wall socket or power distribution unit, and provides a source 1222 neutral 1221 and ground 1223 electrical inputs to the controller circuit 1200 and switching block 1210 of the temperature controller. In one embodiment, the source 1222 couples with the voltage 2 input 1207 of the controller circuit 1200 via a fuse 1208. The source 1222 also couples with the heat in 1204 and cool in 1202 inputs. Based on an input at the temperature sensor input 1205, which is routed from the temperature sensor (e.g., thermal probe 815) of the fermentation vessel, the cool out 1201 or heat out 1203 signals can be enabled, which can be routed to the fluid pump 1213 or the heating element power 1212 respectively.

In one embodiment, the neutral 1221 electrical input of the power feed block 1220 is coupled with output lines which route to the heating element neutral 1211 and fluid pump neutral 1214 signals, as well as the voltage 1 input 1206 to the controller circuit 1200. The ground signal 1215 of the switching block 1210 is coupled with the ground 1223 of the power feed block 1220.

Figure 13:
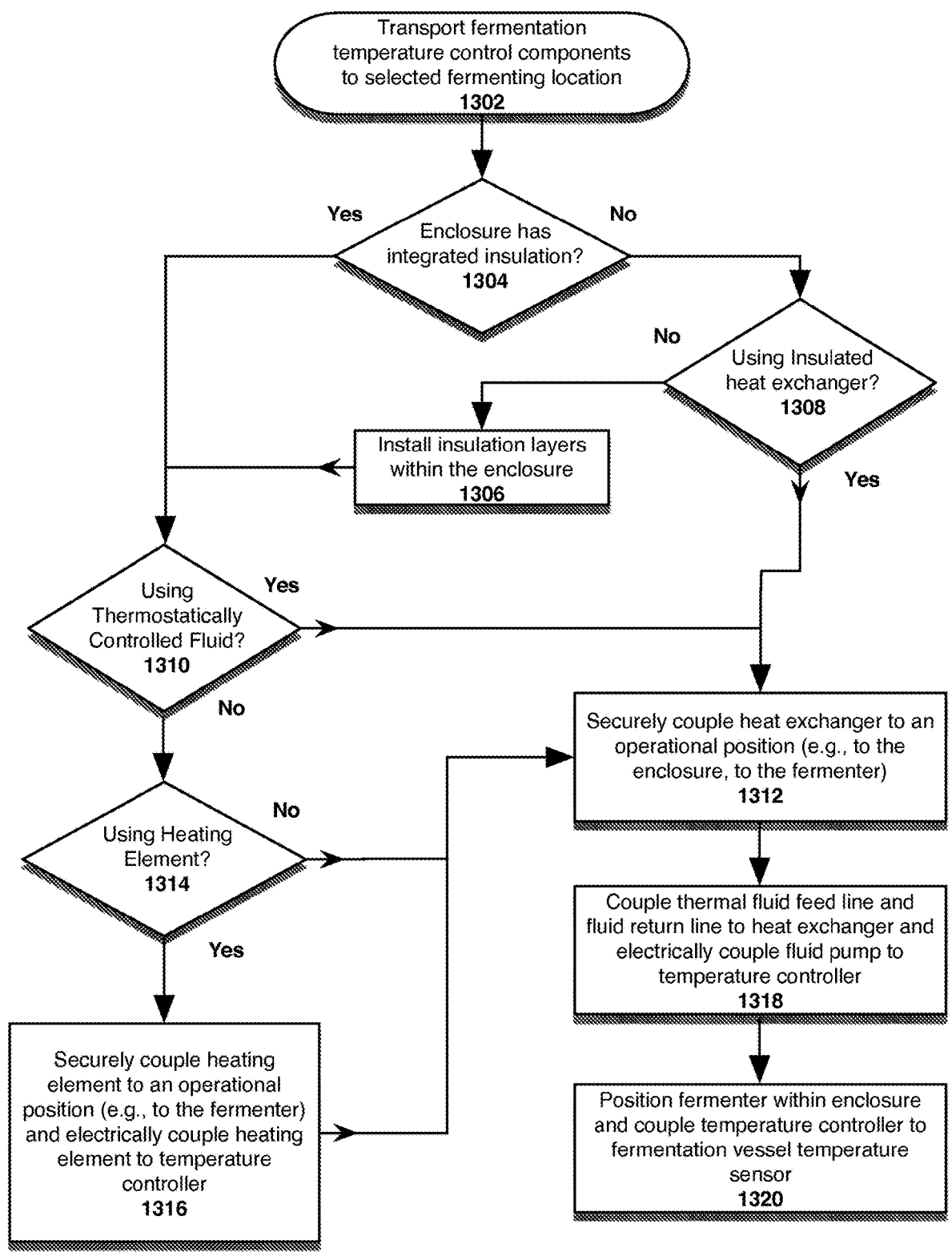
FIG. 13 is a flow diagram of a method of assembling a thermal management system for beer and wine fermentation, according to an embodiment.

FIG. 13 is a flow diagram of a method of assembling a thermal management system for beer and wine fermentation, according to an embodiment. An embodiment of a thermal management system as described herein can be assembled first by transporting the components of the fermentation temperature control system to a selected location for fermentation, as shown at block 1302. The components of the various embodiments are designed to be portable and transportable without heavy lifting machinery, and the system can be assembled transported and disassembled as required. Assembly can vary based on the embodiments and assemblies selected to construct the system, as shown at block 1304. In one embodiment, an enclosure can have an integrated insulation layer within the walls, bottom and lid of the enclosure. If the enclosure has an integrated insulation layer, assembly can proceed to block 1310. At block 1310, if the system is to use a thermostatically controlled fluid to manage fermentation temperatures, assembly can proceed to block 1312.

An embodiment utilizing a thermostatically controlled fluid can alternately heat or cool the fermentation vessel by controlling the temperature of the thermal fluid, which is feed to the heat exchanger. In one embodiment, the temperature within the thermal fluid reservoir can be controlled. In one embodiment, alternate cold and hot fluids from a statically positioned thermal fluid feed can be alternately selected or mixed before being fed to the heat exchanger. When not using a thermostatically controlled fluid, assembly can proceed to block 1314.

Returning to block 1304, if the enclosure is an enclosure assembly such as enclosure assembly 500 of FIG. 5 with removable insulation layers, an intermediate assessment at block 1308 is made to determine if an insulated heat exchanger will be used. If an insulated heat exchanger will not be used, assembly can proceed to block 1306, where the removable insulation layers can be installed within the enclosure. If the removable insulation layers are not available, or the enclosure is an embodiment without integrated insulation, and without removably installable insulation, an insulated heat exchanger can be used, such as heat exchanger 600, which contains additional insulating material, and assembly can proceed to block 1312. In one embodiment, an insulating enclosure can be excluded in favor of an embodiment of heat exchanger 600 with sufficient dimensions and insulation to serve as both a heat exchanger and insulating enclosure for free standing conical fermenters from 28 liters, up to and including 103 liters. In one embodiment, multiple heat exchangers of a smaller dimension may be coupled to form a component of a thermal management system for free standing, smooth walled conical fermenters.

At block 1312, assembly of an embodiment of a thermal management system can proceed to an assembly operation to securely couple the heat exchanger into an operational position suitable for the combination of enclosure and fermentation vessel. For example, an embodiment of a flexible heat exchanger can be configured to couple to the inner walls of an embodiment of a fermentation vessel enclosure, while one embodiment of a heat exchanger can be configured to couple directly to the outer surface of a fermentation vessel, for example via a support strap and/or hook and loop fastener. In one embodiment, a heat exchanger can be configured to couple to and securely strap to an outer surface of a freestanding conical fermentation vessel.

In one embodiment, as shown at block 1310, a thermostatically controlled fluid can be pumped through a heat exchanger during fermentation. At block 1310, where thermostatic control of the thermal fluid is not utilized, an embodiment of the system can maintain a fluid reservoir containing a chilled thermal fluid to act as a coolant when employed within the heat exchanger. In one embodiment, the coolant is actively or passively maintained within a temperature range below the ambient air temperature surrounding the thermal management system. Accordingly, in one embodiment, a thermostatically controlled coolant is used, where the coolant is specifically maintained within a specific temperature range below the ambient air temperature outside of the fermentation vessel, or fermentation vessel enclosure.

Where only a cooling system is used, at block 1314, it can be determined whether a heating element will be employed. In exothermic fermentation cycles, certain climate environments can utilize a cooling only method of thermal management, where a coolant is used in the heat exchanger, and no heating element is employed. Accordingly, assembly can proceed to block 1312, where the heat exchanger is securely coupled to an operational position. In certain environments, as indicated at block 1314, a heating element can be used to provide increased thermal energy into the fermentation process. Where a heating element is used, assembly can proceed to block 1316, where a heat exchanger is securely coupled to an operational position (e.g., to the fermentation vessel), and additionally coupled to a temperature controller, which can be a multiple stage temperature controller suitable for controlling both the heat exchanger and, in one embodiment, the coolant pump.

Sequentially or in parallel with other assembly operations, block 1318 indicates that the thermal fluid feed lines and fluid returns lined are coupled to the heat exchanger ports. In one embodiment, the heat exchanger ports, as well as other fluid bearing lines within the system, are coupled with quick disconnect couplers, to enable rapid assembly and disassembly of the fluid lines. Additionally, as indicated at block 1320, the fermentation vessel can be positioned within an embodiment of a fermentation vessel enclosure, or fermentation vessel enclosure assembly, and a temperature sensor attached, or inserted into the fermentation vessel is coupled with the temperature controller. In one embodiment, an insulating layer of an insulated heat exchanger performs an insulating role in a manner similar to a fermentation vessel enclosure.

When managing a single fermenter, the thermal management system can set and maintain a fermentation vessel internal temperature at a differential of over 40° C. from ambient temperatures. Experimental results of an embodiment of a thermal management system in a cooling configuration are listed in Table 1 below.

TABLE 1

Fermentation Vessel Cooling Experimental Results:

| Time (Hours) | Ambient Temperature ° C. | Fermentation Vessel Temperature ° C. |
|---|---|---|
| 0 | 26.7 | 13.9 |
| 1 | 35.0 | 12.8 |
| 2 | 40.6 | 11.1 |
| 3 | 42.8 | 8.9 |
| 4 | 43.3 | 6.1 |
| 5 | 43.3 | 5.0 |
| 6 | 44.4 | 3.9 |
| 7 | 46.1 | 3.9 |
| 8 | 46.7 | 5.6 |

In Table 1 above, a test chamber with dimensions of 2 meters long, 1 meter wide, and 1.3 meters high$_{SEP}^L$ was constructed, and a 750-watt heating unit was positioned on the floor of the test chamber approximately 0.9 meters from a pair of 19-liter carboy fermenters, which were each enclosed in an embodiment of the temperature management system described herein. Three temperature probes were placed within the test chamber to measure the ambient air temperature inside of the chamber: Probe 1 was located 254 mm from the fermenter, 762 mm above the test chamber floor; Probe 2 was located 533 mm from the fermenter, 889 mm above the test chamber floor; Probe 3 was located 1.4 meters from the fermenter, 457 mm above the test chamber floor. The enclosed fermenters were placed on an elevated platform 317 mm above the test chamber floor.

In Table 1 above, the lowest test chamber temperature reading is listed, while the higher of the fermenter temperature readings is listed. As indicated, as the ambient temperature in the test chamber increased from 26.7° C. to 46.1° C. due to the heating unit, the fermentation vessel internal temperature was reduced from 13.9° C. to 3.9° C. due to the active cooling effect of the temperature management system. During the experiment reflected in the data of Table 1 above, the power to the fluid pump providing cooling fluid to the heat exchanger was removed at hour 6, and the active cooling function of the thermal management system was ceased. Based on the insulative effects of the fermenter chamber enclosure alone, the temperature was maintained at 3.9° C. until rising to 5.6° C. at hour 8. Accordingly, the effectiveness and utility of the thermal management system has been demonstrated through experimental results.

Variations on the temperature management assemblies and systems are also within the scope of the embodiments. When the heat exchanger is utilized as a cooling device, the thermal management system has sufficient performance to cool multiple fermenters coupled within a single system. In one embodiment a system for managing multiple fermentation vessels can be assembled, where multiple heat exchangers are linked via thermal fluid feed and fluid return manifolds, to allow multiple fermenters to be managed within a single thermal management system.

While there have been shown and described and pointed out the fundamental novel features of the invention as applied to the various embodiments, it will be understood that the foregoing is considered as illustrative only of the principles of the invention and not intended to be exhaustive or to limit the invention to the precise forms disclosed. Modifications or variations are possible in light of the above teachings, and the embodiments discussed were chosen and described to provide the best illustration of the principles of the invention and its practical application to enable one of ordinary skill in the art to utilize the invention in various embodiments and with various modifications as are suited to the particular use contemplated. Accordingly, it will be evident that various modifications may be made thereto without departing from the broader spirit and scope of the invention as set forth in the following claims.

What is claimed is:

1. A portable thermal management system to provide temperature management for a liquid within a container vessel, the portable thermal management system comprising:
a flexible heat exchanger manufactured from a flexible polymer material, the flexible heat exchanger to removably couple with an external surface of the container vessel, wherein to removably couple with the external surface of the container vessel, the flexible heat exchanger is to wrap the external surface of the container vessel, the flexible heat exchanger including an inlet, an outlet, a thermally conductive layer, a thermally insulative layer, and a fastener section, wherein the thermally conductive layer includes multiple fluid channels to flow a thermally conductive fluid, the thermally insulative layer is to insulate the container vessel, and the fastener section is to enable the flexible heat exchanger to be removably secured with the external surface of the container vessel via one or more fasteners; and
a temperature controller in electrical communication with a temperature sensor, the temperature sensor coupled with the container vessel to sense a temperature of a liquid within the container vessel, wherein the temperature controller includes a programmable two-stage temperature controller that is configured to activate and deactivate a drive motor of a fluid pump.

2. The portable thermal management system of claim 1, wherein the one or more fasteners include one or more straps.

3. The portable thermal management system of claim 1, wherein the one or more fasteners include one or more hook and loop fasteners.

4. The portable thermal management system as in claim 1, wherein the multiple fluid channels of the flexible heat exchanger enable fluid to flow in alternating directions within the heat exchanger.

5. The portable thermal management system of claim 1, wherein the container vessel is a fermentation vessel suitable for beer and wine fermentation.

6. The portable thermal management system as in claim 1, wherein the thermally conductive fluid is to cool the container vessel below the ambient air temperature outside of the container vessel.

7. The portable thermal management system as in claim 1, wherein the inlet or the outlet of the flexible heat exchanger is configured to couple with the fluid pump, the fluid pump to cause a thermally conductive fluid to flow from a fluid reservoir into the flexible heat exchanger.

8. The portable thermal management system as in claim 7, wherein the fluid reservoir includes the fluid pump.

9. The portable thermal management system as in claim 7, wherein the inlet or outlet of the flexible heat exchanger includes flexible conduit configured to couple via a quick disconnect coupler.

10. The portable thermal management system as in claim 7, the flexible heat exchanger configured to couple with the fluid reservoir, the fluid reservoir to contain the thermally conductive fluid, and the thermally conductive fluid contained in the fluid reservoir to be maintained below an ambient air temperature outside of the container vessel.

11. The portable thermal management system as in claim 1, wherein the container vessel is a conical fermenter vessel.

12. The portable thermal management system as in claim 1, additionally comprising multiple separate flexible heat exchangers to removably couple to the external surface of the container vessel, wherein the multiple separate flexible heat exchangers are to couple to a fluid reservoir via one or more thermal fluid feed manifolds, thermal fluid return manifolds, or thermal fluid feed and return manifolds.

13. A portable thermal management system to provide temperature management for a liquid within a portable container vessel, the portable thermal management system comprising:
a flexible heat exchanger manufactured from a flexible polymer material, the flexible heat exchanger to removably couple with an external surface of the portable container vessel, wherein to removably couple with the external surface of the portable container vessel, the flexible heat exchanger is to wrap the external surface of the portable container vessel, the flexible heat exchanger including an inlet, an outlet, a thermally conductive layer, a thermally insulative layer, and a fastener section, wherein the thermally conductive layer includes multiple fluid channels to flow a thermally conductive fluid, the thermally insulative layer is to insulate the portable container vessel, and the fastener section is to enable the flexible heat exchanger to be removably secured with the external surface of the portable container vessel via one or more fasteners; and
a temperature controller in electrical communication with a temperature sensor, the temperature sensor coupled with the portable container vessel to sense a temperature of a liquid within the portable container vessel, wherein the temperature controller includes a programmable two-stage temperature controller that is configured to activate and deactivate a drive motor of a fluid pump.

14. The portable thermal management system of claim 13, wherein the one or more fasteners include one or more straps.

15. The portable thermal management system of claim 13, wherein the one or more fasteners include one or more hook and loop fasteners.

16. The portable thermal management system as in claim 13, wherein the multiple fluid channels of the flexible heat exchanger enable fluid to flow in alternating directions within the heat exchanger.

17. The portable thermal management system of claim 13, wherein the portable container vessel is a fermentation vessel suitable for beer and wine fermentation.

18. The portable thermal management system as in claim 13, wherein the thermally conductive fluid is to cool the portable container vessel below the ambient air temperature outside of the portable container vessel.

19. The portable thermal management system as in claim 13, wherein the inlet or the outlet of the flexible heat exchanger is configured to couple with the fluid pump, the fluid pump to cause a thermally conductive fluid to flow from a fluid reservoir into the flexible heat exchanger.

20. The portable thermal management system as in claim 19, the flexible heat exchanger configured to couple with the fluid reservoir, the fluid reservoir to contain the thermally conductive fluid, and the thermally conductive fluid contained in the fluid reservoir to be maintained below an ambient air temperature outside of the portable container vessel.

21. The portable thermal management system as in claim 13, wherein the portable container vessel is a conical fermenter vessel.

* * * * *